United States Patent
Miyata et al.

(10) Patent No.: US 10,885,290 B2
(45) Date of Patent: Jan. 5, 2021

(54) CODE READING DEVICE, METHOD, AND PROGRAM

(71) Applicant: NEC Platforms, Ltd., Kawasaki (JP)

(72) Inventors: Kotaro Miyata, Kanagawa (JP); Hideo Yokoi, Kanagawa (JP); Motoko Umeta, Kanagawa (JP); Takuro Nagano, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/604,224

(22) PCT Filed: Apr. 13, 2018

(86) PCT No.: PCT/JP2018/015483
§ 371 (c)(1),
(2) Date: Oct. 10, 2019

(87) PCT Pub. No.: WO2018/190411
PCT Pub. Date: Oct. 18, 2018

(65) Prior Publication Data
US 2020/0117868 A1    Apr. 16, 2020

(30) Foreign Application Priority Data
Apr. 13, 2017    (JP) ................ 2017-079513

(51) Int. Cl.
*G06K 7/10* (2006.01)
*G06K 7/12* (2006.01)
*G06K 7/14* (2006.01)
*G06K 19/06* (2006.01)
*G06Q 30/02* (2012.01)

(52) U.S. Cl.
CPC ........... *G06K 7/12* (2013.01); *G06K 7/10574* (2013.01); *G06K 7/1417* (2013.01); *G06K 19/0614* (2013.01); *G06Q 30/0238* (2013.01)

(58) Field of Classification Search
CPC .... G06K 7/12; G06K 7/10574; G06K 7/1417; G06K 19/0614; G06Q 30/0238
USPC .................................................. 235/462.01
See application file for complete search history.

(56) References Cited

U.S. PATENT DOCUMENTS

2011/0239508 A1    10/2011   Honda et al.
2015/0347889 A1    12/2015   Nosaka et al.

FOREIGN PATENT DOCUMENTS

| JP | 2002-024756 A | 1/2002 |
| JP | 2006-330673 A | 12/2006 |
| JP | 2008-164819 A | 7/2008 |
| JP | 2009-098494 A | 5/2009 |

(Continued)

OTHER PUBLICATIONS

International Search Report for PCT Application No. PCT/JP2018/015483, dated May 29, 2018.

(Continued)

*Primary Examiner* — Daniel A Hess

(57) ABSTRACT

A POS terminal (code reading device) according to one example embodiment of the present invention includes: a code reading unit that reads information of a code based on a reflected light from the code attached to an item; and a discount processing unit that, when the information of the code is not read by using a first light being irradiated on the code and the information of the code is read by using a second light being irradiated on the code, makes a discount associated with the second light for the item, wherein the second light is different from the first light.

8 Claims, 23 Drawing Sheets

(56) References Cited

FOREIGN PATENT DOCUMENTS

| | | |
|---|---|---|
| JP | 2010-145465 A | 7/2010 |
| JP | 2012-043175 A | 3/2012 |
| JP | 2012-098943 A | 5/2012 |
| JP | 2013-225331 A | 10/2013 |
| JP | 2013-228816 A | 11/2013 |
| JP | 2015-084199 A | 4/2015 |
| JP | 2015-184780 A | 10/2015 |
| JP | 2015-210612 A | 11/2015 |

OTHER PUBLICATIONS

Japanese Office Action for JP Application No. 2017-079513 dated Jan. 30, 2019 with English Translation.

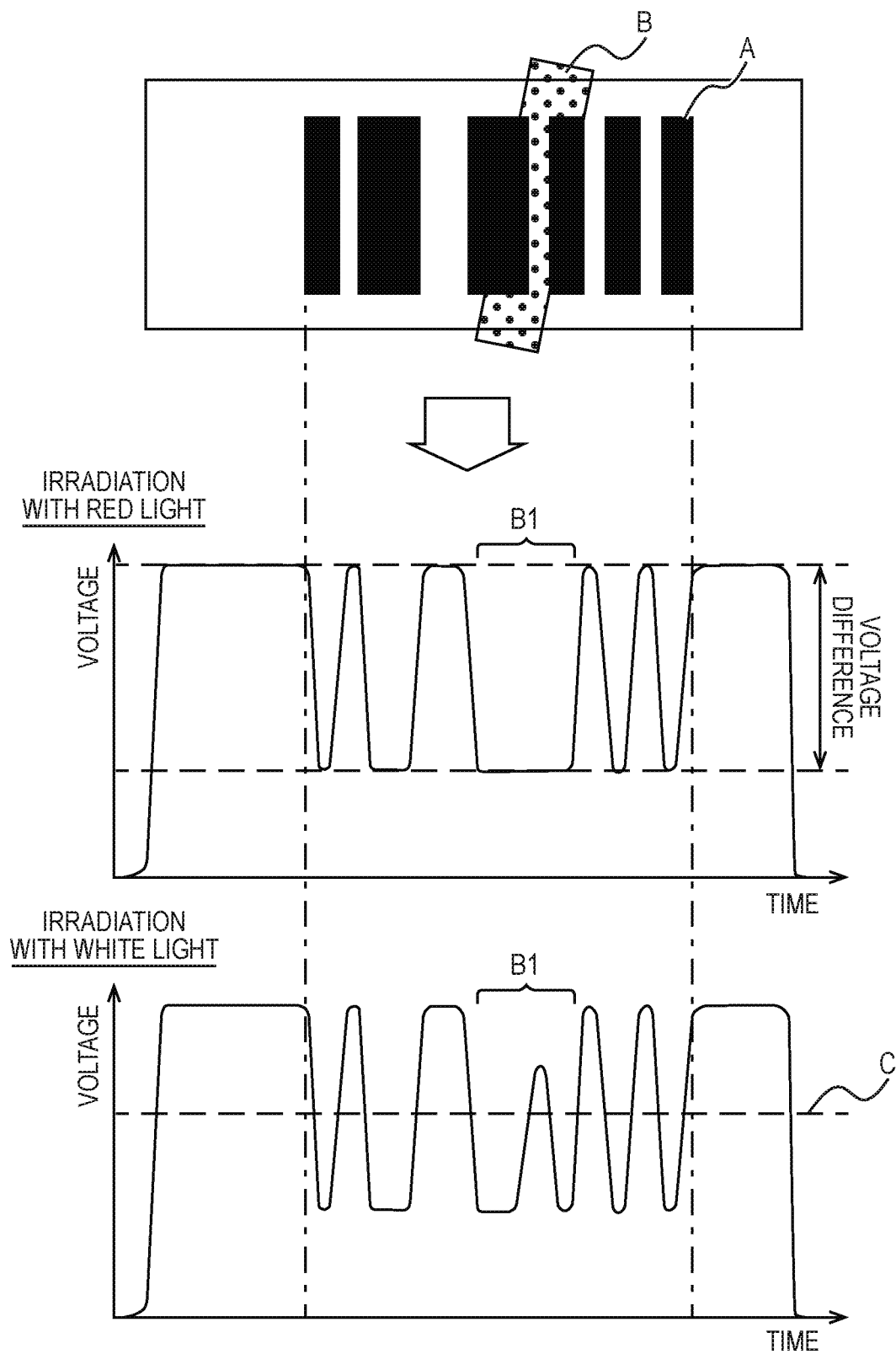

FIG. 9

| LINE COLOR | LIGHT COLOR | | | |
|---|---|---|---|---|
| | WHITE | GREEN | BLUE | RED |
| NO LINE | ○ | ○ | ○ | ○ |
| GREEN | ○ | ○ | × | × |
| BLUE | ○ | × | ○ | × |
| RED | ○ | × | × | ○ |

FIG. 13

| LINE COLOR | DISCOUNT | LIGHT COLOR | | |
|---|---|---|---|---|
| | | GREEN | BLUE | RED |
| NO LINE | 0% | ○ | ○ | ○ |
| GREEN | 20% | ○ | × | × |
| BLUE | 30% | × | ○ | × |
| RED | 50% | × | × | ○ |

FIG. 20

| LINE COLOR | DISCOUNT | LIGHT COLOR | | | | | | |
|---|---|---|---|---|---|---|---|---|
| | | RED | BLUE | GREEN | RED + BLUE | RED + GREEN | BLUE + GREEN | RED + BLUE + GREEN |
| RED | 50% | ○ | × | × | ○ | ○ | × | ○ |
| RED + BLUE | 50% | × | × | × | ○ | × | × | ○ |
| RED + GREEN | 50% | × | × | × | × | ○ | × | ○ |
| RED + BLUE + GREEN | 50% | × | ○ | × | ○ | × | ○ | ○ |
| BLUE | 30% | × | × | ○ | × | × | ○ | ○ |
| BLUE + GREEN | 30% | × | × | ○ | ○ | ○ | ○ | ○ |
| GREEN | 20% | ○ | ○ | ○ | ○ | ○ | ○ | ○ |
| NO LINE | 0% | ○ | ○ | ○ | ○ | ○ | ○ | ○ |

CODE READING DEVICE, METHOD, AND PROGRAM

This application is a National Stage Entry of PCT/JP2018/015483 filed on Apr. 13, 2018, which claims priority from Japanese Patent Application 2017-079513 filed on Apr. 13, 2017, the contents of all of which are incorporated herein by reference, in their entirety.

TECHNICAL FIELD

The present invention relates to a code reading device, a code reading method, and a code reading program used for reading a code attached to an item in a shop.

BACKGROUND ART

Conventionally, in a shop, a seal indicating a discount rate such as "30% discount" or a discount price such as "100 Yen discount" is attached to an item for discount, and a discount process is performed by a shop assistant manually inputting the discount rate or the discount price, which is indicated by the seal, to a Point of Sales (POS) terminal (also referred to as a register) at check.

Further, Patent Literature 1 discloses a technique of printing a label including a barcode indicating a discount rate or a discount price and a reason for discount and attaching the printed label to an item. The POS terminal performs a discount process by reading the barcode and acquiring the discount rate or the discount price.

CITATION LIST

Patent Literature

PTL 1: Japanese Patent Application Laid-Open No. 2013-228816

SUMMARY OF INVENTION

Technical Problem

In a method in which a shop assistant manually inputs a discount rate or a discount price indicated by a seal, there is a problem of the shop assistant overlooking the seal or making a mistake in entry of the discount rate or the discount price.

The technique disclosed in Patent Literature 1 requires a device that prints a label for discount and thus is costly. Further, it takes time because a label is attached to an item after waiting for completion of printing.

The present invention has been made in view of the problems described above and intends to provide a code reading device, a code reading method, and a code reading program that can attach discount information to an item at low cost and automatically acquire the discount information attached to the item.

Solution to Problem

A first example aspect of the present invention is a code reading device including: a reading unit that reads information of a code based on a reflected light from the code attached to an item; and a processing unit that, when the information of the code is not read by using a first light being irradiated on the code and the information of the code is read by using a second light being irradiated on the code, makes a discount associated with the second light for the item, wherein the second light is different from the first light.

A second example aspect of the present invention is a code reading method including: reading information of a code based on a reflected light from the code attached to an item; and when the information of the code is not read by using a first light being irradiated on the code and the information of the code is read by using a second light being irradiated on the code, making a discount associated with the second light for the item, wherein the second light is different from the first light.

A third example aspect of the present invention is a code reading program that causes a computer to perform: reading information of a code based on a reflected light from the code attached to an item; and when the information of the code is not read by using a first light being irradiated on the code and the information of the code is read by using a second light being irradiated on the code, making a discount associated with the second light for the item, wherein the second light is different from the first light.

Advantageous Effects of Invention

According to the present invention, discount information can be attached to an item at low cost, and the discount information attached to the item can be automatically acquired.

BRIEF DESCRIPTION OF DRAWINGS

FIG. 7 is a diagram illustrating a graph of the light reception intensity according to the code reading method according to the first example embodiment.

FIG. 9 is a diagram illustrating a table as to whether or not reading is successful for each combination of a color of a discount line and a color of a light used for reading in a second example embodiment.

FIG. 13 is a diagram illustrating a table of discounts applied to respective combinations of colors of discount lines and colors of lights used in reading in the fourth example embodiment.

FIG. 20 is a diagram illustrating a table of discounts applied to respective combinations of colors of discount lines and colors of lights used in reading in the fifth example embodiment.

DESCRIPTION OF EMBODIMENTS

Figure 1:
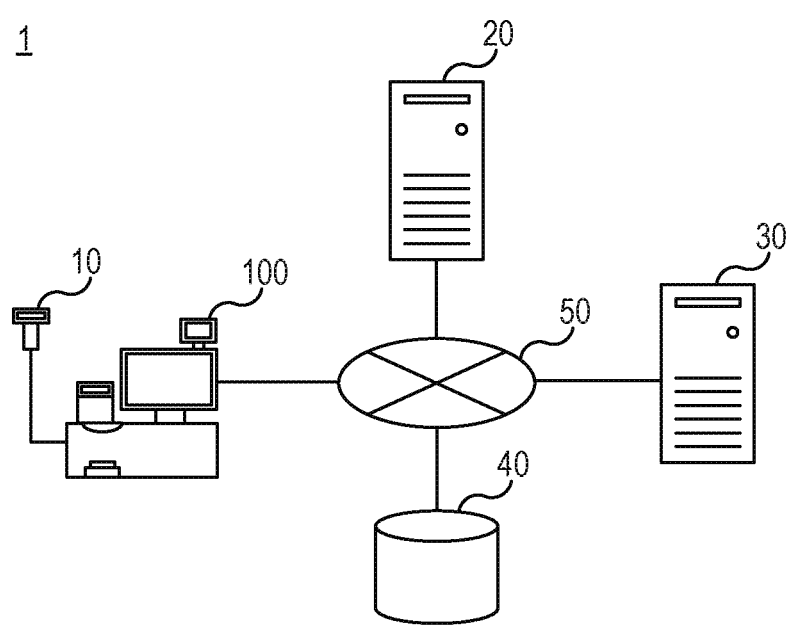
FIG. 1 is a schematic diagram of a POS system according to a first example embodiment.

While example embodiments of the present invention will be described below with reference to the drawings, the present invention is not limited to these example embodiments. Note that, in the drawings described below, components having the same function are labeled with the same reference, and the repeated description thereof may be omitted.

First Example Embodiment

FIG. 1 is a schematic diagram of a POS system 1 according to the present example embodiment. The POS system 1 includes a POS terminal 100 (sales of point information management terminal), a POS server 20, a Price Look Up (PLU) server 30, and a sales information storage device 40 that stores sales information. The POS terminal 100, the POS server 20, the PLU server 30, and the sales information storage device 40 are connected by at least one of wired connection and wireless connection via any network 50 such as a local area network, the Internet, or the like. The POS system 1 may include a device such as another server, another terminal, or the like. Further, at least some of the POS terminal 100, the POS server 20, the PLU server 30, and the sales information storage device 40 may be configured as a single device.

The POS server 20 is a server that manages the POS terminal 100 or collects sales information. The PLU server 30 is a server that pre-stores item information indicating an item name, a price, or the like associated with an identifier of an item, acquires item information in response to an inquiry from the POS terminal 100, and transmits the item information to the POS terminal 100. A content and a storage form of item information are arbitrarily determined. The POS server 20 and the PLU server 30 are connected to the network 50 through wired communication or wireless communication and formed of a single computer or a cloud that is a collection of computer resources, respectively.

The sales information storage device 40 stores sales information (also referred to as journal data) indicating sales of an item paid at the POS terminal 100. A content and a storage form of sales information are arbitrarily determined. The sales information storage device 40 is connected to the network 50 through wired communication or wireless communication and formed of a single storage device or a combination of a plurality of storage devices. Further, the sales information storage device 40 may be built in the POS terminal 100, the POS server 20, or the PLU server 30.

The POS terminal 100 is a code reading device that is connected to a code scanner 10 and reads a code of a barcode (one-dimensional code), a two-dimensional code, or the like attached to an item by using the code scanner 10. Furthermore, the POS terminal 100 acquires an identifier of an item from the read code, acquires item information from the PLU server 30 based on the identifier, and registers the acquired item information as a payment subject. At this time, as described later, the POS terminal 100 determines whether or not to make a discount by changing the color (wavelength) of an irradiation light from the code scanner 10 and reading a code and reflects the determined discount to item information. The POS terminal 100 then accepts a payment from a customer by using the acquired item information, generates sales information from the item information on which a payment is made, and stores the generated sales information in the sales information storage device 40.

Figure 2:
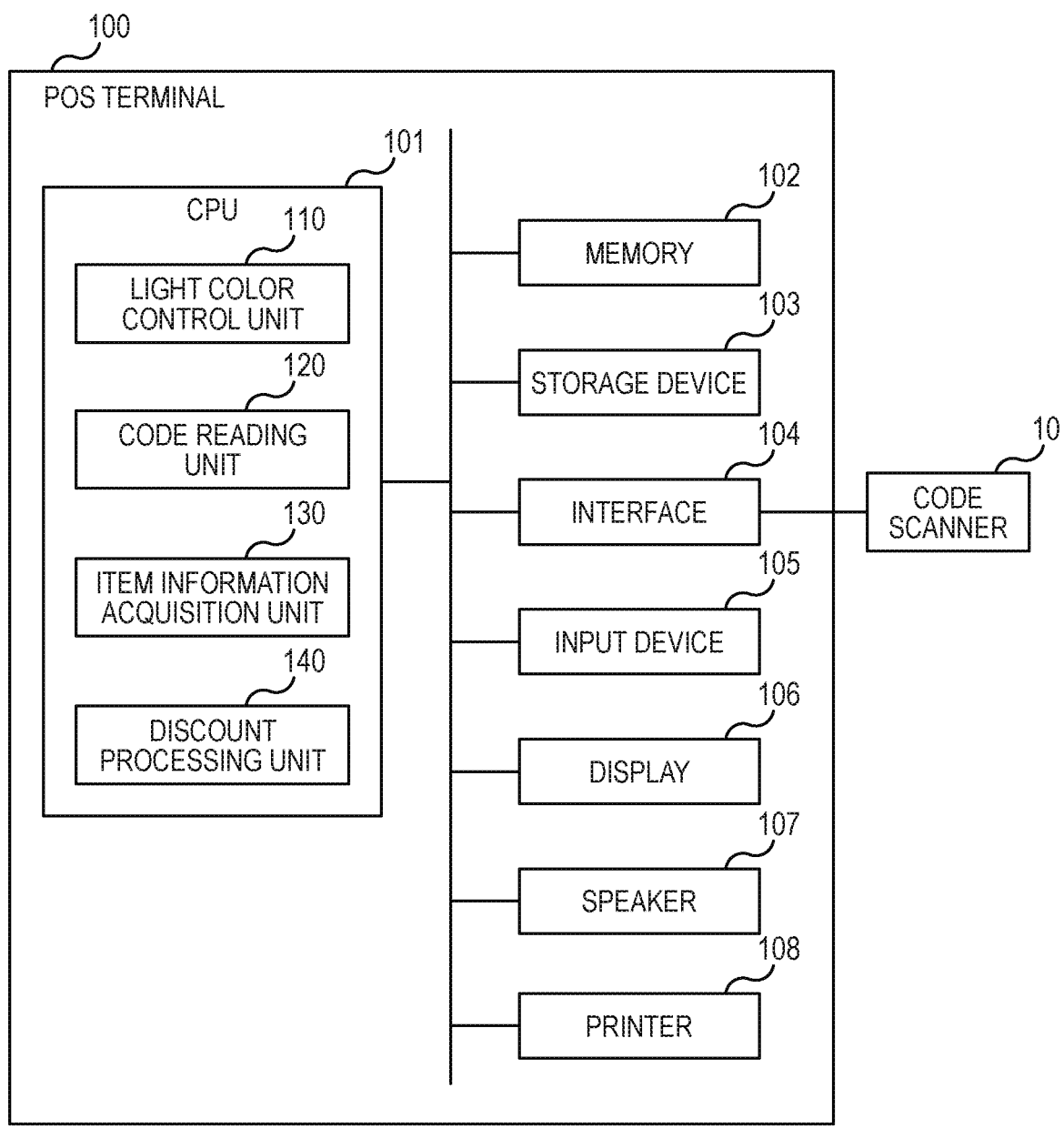
FIG. 2 is a schematic configuration diagram of a POS terminal according to the first example embodiment.

FIG. 2 is a schematic configuration diagram of the POS terminal 100 according to the present example embodiment. The POS terminal 100 has a central processing unit (CPU) 101, a memory 102, a storage device 103, and an interface 104. Furthermore, the POS terminal 100 has an input device 105, a display 106, a speaker 107, and a printer 108. The POS terminal 100 is not limited to the configuration illustrated in FIG. 2 but may further have other components. The POS terminal 100 may be formed of one or a plurality of devices or may be formed integrally with another device. Further, the POS terminal 100 may be connected to a separate device, and at least a part of the process performed by the POS terminal 100 in the present example embodiment may be performed by the separate device.

The interface 104 is a communication unit that transmits and receives data and is configured to be able to perform at least one communication scheme of wired communication and wireless communication. The interface 104 includes a processor, an electric circuit, an antenna, a connection terminal, or the like required for the communication scheme. The interface 104 performs communication by using such communication scheme in accordance with a signal from the CPU 101.

The storage device 103 stores a program executed by the POS terminal 100, data of a process result obtained by the program, or the like. The storage device 103 includes a read only memory (ROM) dedicated to reading, a hard disk drive or a flash memory that is readable and writable, or the like. Further, the storage device 103 may include a computer readable portable storage medium such as a CD-ROM. The memory 102 includes a random access memory (RAM) or the like that temporarily stores data being processed by the CPU 101 or data read from the storage device 103.

The CPU 101 is a processor that temporarily stores temporary data used for processing in the memory 102, reads a program stored in the storage device 103, and executes various processing operations such as calculation, control, determination, or the like on the temporary data in accordance with the program. Further, the CPU 101 stores data of a process result in the storage device 103 and also transmits data of the process result externally via the interface 104.

The input device 105 includes a keyboard or the like that accepts entry mainly from a shop assistant and transmits input contents to the CPU 101 as a signal. A touchscreen in which the input device 105 and the display 106 are integrated may be used.

The display 106 is a display device that displays information to a shop assistant or a customer. Any display device such as a cathode ray tube (CRT) display, a liquid crystal display, or the like may be used as the display 106. The display 106 displays predetermined information such as an item name, a price, or the like in accordance with a signal from the CPU 101. The displays 106 may be provided on the shop assistant side and a customer side, respectively, and in such a case, different information may be displayed on each of the displays 106.

The speaker 107 is a voice output device that outputs voice in accordance with a signal from the CPU 101. The printer 108 is a printer device that prints a receipt, a cash receipt, a voucher ticket, or the like in accordance with a signal from the CPU 101. Any printer device such as a thermal printer, an ink jet printer, a laser printer, or the like may be used as the printer 108.

The interface 104 is connected to the network 50 and connected to the code scanner 10 in the present example embodiment. As the code scanner 10, any of a handy type code scanner 10 illustrated in FIG. 3 and a stationary type code scanner 10 illustrated in FIG. 4 may be used.

Figure 3:
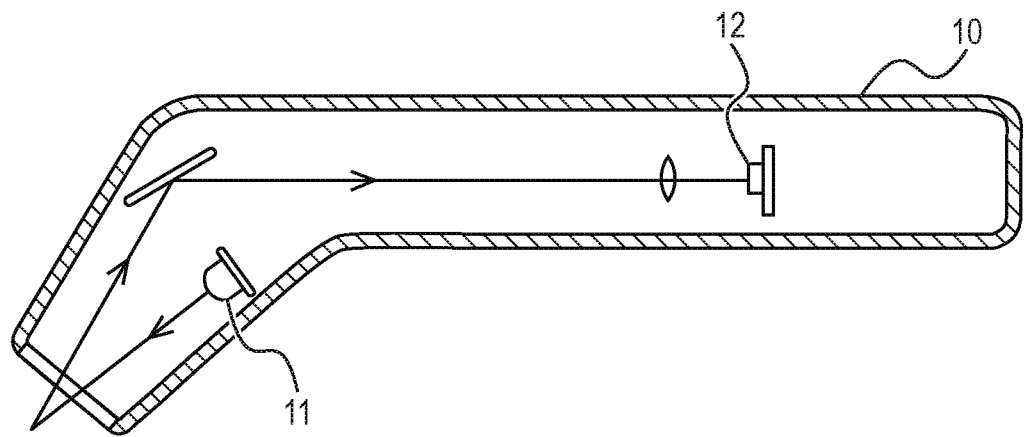
FIG. 3 is a sectional view of a handy type code scanner according to the first example embodiment.

FIG. 3 is a sectional view of the handy type code scanner 10. The handy type code scanner 10 has a light emitting element 11 and a light receiving element 12 used for scanning a code attached to an item. FIG. 3 schematically illustrates a light path from the light emitting element 11 to the light receiving element 12 by arrows. A light from the light emitting element 11 is emitted to an item via a window provided in a part of the code scanner 10. Furthermore, a mirror that further reflects and guides a reflected light from an item to the light receiving element 12 and a lens that captures a reflected light from the item on the light receiving element 12 are provided inside the code scanner 10.

The light emitting element 11 corresponds to light emitting elements that generate at least lights of the three primary colors of a red light, a green light, and a blue light and, generation of lights of respective colors can be controlled independently. The light emitting element 11 is provided to a position from which a code attached on an item can be irradiated with a light. The color of a light corresponds to the wavelength of the light, and the wavelength region of each color conforms to a known definition. As the light emitting element 11, any light emitting element that can generate a light of a predetermined wavelength, such as a light emitting diode (LED), a laser diode (LD), or the like, can be used. The light emitting element 11 generates a light at a predetermined color (wavelength) and a timing in accordance with a control signal from the CPU 101 of the POS terminal 100 and irradiates a code attached to an item with the generated light.

In response to receiving a reflected light generated by a light from the light emitting element 11 being reflected by a code attached to an item, the light receiving element 12 converts the reflected light into a signal. The light receiving element 12 then transmits a signal indicating a reflected light from a code attached to an item to the CPU 101 of the POS terminal 100. As the light receiving element 12, any light receiving element may be used that can convert a light into an electrical signal, such as a Charge Coupled Device (CCD) sensor, a Complementary Metal Oxide Semiconductor (CMOS) sensor, or the like.

Figure 4:
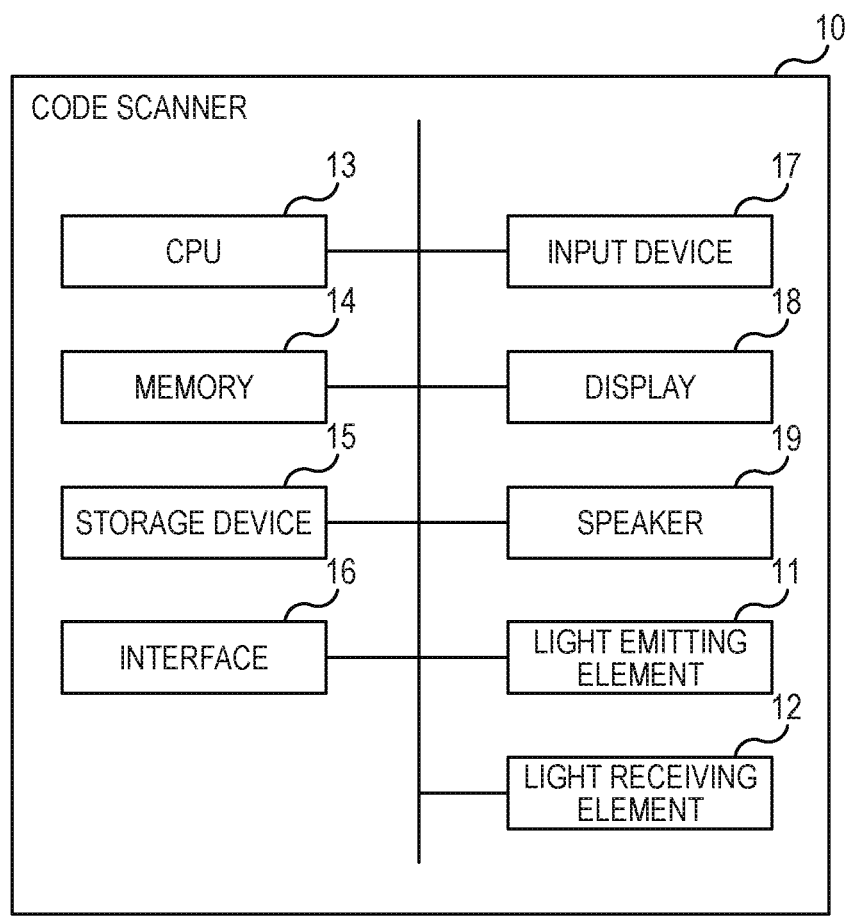
FIG. 4 is a schematic configuration diagram of a stationary type code scanner according to the first example embodiment.

FIG. 4 is a schematic configuration diagram of the stationary type code scanner 10. The stationary type code scanner 10 has a CPU 13, a memory 14, a storage device 15, an interface 16, an input device 17, a display 18, and a speaker 19 in addition to the light emitting element 11 and the light receiving element 12. The features of the CPU 13, the memory 14, the storage device 15, the interface 16, the input device 17, the display 18, and the speaker 19 are the same as those of the CPU 101, the memory 102, the storage device 103, the interface 104, the input device 105, the display 106, and the speaker 107 of the POS terminal 100. The stationary type code scanner 10 has the CPU 13 and thus operates alone without subjected to control from the POS terminal 100. The stationary type code scanner 10 scans a code attached to an item by using the light emitting element 11 and the light receiving element 12 in the same manner as the handy type code scanner 10 illustrated in FIG. 3.

The POS terminal 100 according to the present example embodiment functions as a code reading device. In more detail, the CPU 101 of the POS terminal 100 functions as a light color control unit 110, a code reading unit 120, an item information acquisition unit 130, and a discount processing unit 140 described later by executing a program stored in the storage device 103.

Figure 5:
FIG. 5 is a front view of an exemplary code used in the first example embodiment.

In the following, a code reading method using the code reading device (the POS terminal 100) according to the present example embodiment will be described by using FIG. 5 to FIG. 8. FIG. 5 is a front view of an exemplary code A used in the present example embodiment. In the present example embodiment, a barcode (one-dimensional code) representing a Japan Article Number (JAN) code is used as the code A. The JAN code is a 13-digit or 8-digit number and used as an identifier of an item. A barcode represents information with bold lines, thin lines, bold spaces, and thin spaces being aligned with a predetermined rule. While lines are black and spaces are white in a barcode in the present example embodiment, any combination of other colors that are distinguishable by the code scanner 10 may be used. As the code A, any code that encodes information by a printed symbol, such as other one-dimensional codes, two-dimensional codes, or the like, may be used.

The POS terminal 100 acquires a JAN code as an identifier of an item by causing the code scanner 10 to read the code A and decoding the code A with a predetermined rule. The JAN code indicated by the code A is expressed by numbers near the code A. When the code scanner 10 is unable to read a barcode, a shop assistant may reference the numbers and input the JAN code from the input device 105.

A discount line B of a predetermined color is drawn on the code A of an item which is a discount subject. In the present example embodiment, the color of the discount line B is blue-green that is the complementary color of red. In FIG. 5, the region of the predetermined color (blue-green) is represented by a number of dots. The discount line B is drawn on the code A attached to an item which is a discount subject. At this time, the discount line B is drawn such that the code A cannot be recognized when the region of the discount line B is recognized as black (that is, when filled). In other words, the discount line B is drawn so as to cover a portion of the code A corresponding to at least one of the numbers (13 digits or 8 digits) represented by the code A. When a part of the code A is missed in such a way, an error occurs in decoding the code A, and thus no information of the code A can be read.

When a discount of an item is made for a reason such as best-before date (expiration date) being coming soon, a shop assistant draws the discount line B by using a pen, a stamp, or the like on the code A that has already been attached to the item. When the POS terminal 100 reads the code A, the item of the code A on which the discount line B of a predetermined color is drawn is discounted in a predetermined way by a discount process described later.

Figure 6:
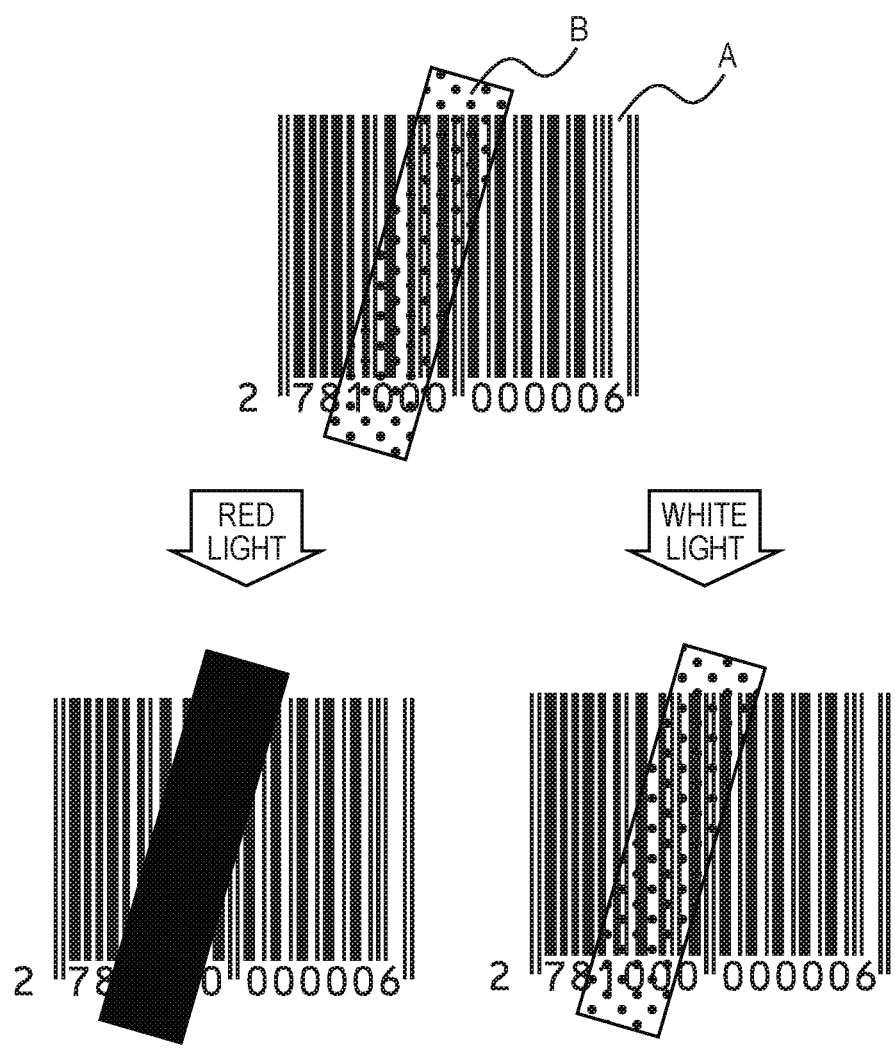
FIG. 6 is a schematic diagram of a code reading method according to the first example embodiment.

FIG. 6 is a schematic diagram of a code reading method according to the present example embodiment. FIG. 6 schematically illustrates a result of reading when the code A on which a blue-green discount line B is drawn is irradiated with a red light and irradiated with a white light from the code scanner 10. Since blue-green is the complementary color of red, the blue-green discount line B does not reflect a red light. Thus, when the code A is irradiated with a red light, since the region of the discount line B is recognized in the same way as the case of black, the POS terminal 100 is no longer able to distinguish a part of lines and spaces included in the code A and is unable to read the information represented by the code A. On the other hand, when the code A is irradiated with a white light, since the region of the discount line B is recognized in the same manner as the case of being watched by human eyes, the POS terminal 100 is able to distinguish lines and spaces included in the code A and is able to read the information represented by the code A.

FIG. 7 is a diagram illustrating a graph of the light reception intensity resulted by the code reading method according to the present example embodiment. The light reception intensity is measured by the light receiving element 12 of the code scanner 10. The upper stage of FIG. 7 illustrates the exemplary code A and discount line B. The middle stage and the lower stage of FIG. 7 illustrate graphs of the light reception intensities (voltages) when the code A and the discount line B in the upper stage are irradiated with a red light or a white light, respectively. The left and right positions in the graphs on the middle stage and the lower stage of FIG. 7 correspond to the left and right positions in the code A and the discount line B on the upper stage. In each graph, a range B1 corresponding to the position of the discount line B is illustrated.

In the graph of FIG. 7, a light is less reflected in a region of a line in the code A resulting in a low voltage, and a light is much reflected in a region of a space in the code A resulting in a high voltage. The POS terminal 100 determines a region in which the voltage is greater than or equal to a predetermined threshold C as a region of a space and determines a region in which the voltage is less than the predetermined threshold C as a region of a line. As the predetermined threshold C, a predetermined ratio (for example, 50%) of the maximum voltage difference obtained by subtracting the minimum value from the maximum value of the voltage of a range corresponding to the code A in the graph is used, for example.

As illustrated in FIG. 6, since the blue-green discount line B does not reflect a red light, in the graph in the middle stage of FIG. 7 when a red light is emitted, the voltage does not rise in the region of the space included in the range B1 of the discount line B and is substantially the same voltage as regions of lines. Thus, the POS terminal 100 is unable to distinguish the region of the line from the region of the space of the code A included in the range B1 of the discount line B when a red light is emitted.

On the other hand, in the graph in the lower stage of FIG. 7 when a white light is emitted, the voltage is higher in the region of the space included in the range B1 of the discount line B than in the regions of lines and is above the predetermined threshold C. Thus, the POS terminal 100 is able to distinguish the region of the line from the region of the space of the code A included in the range B1 of the discount line B when a white light is emitted. Note that, since a part of a white light is absorbed by the blue-green discount line B, the voltage is lower in the region of the space included in the range B1 of the discount line B than in the regions of other spaces.

Figure 8A:
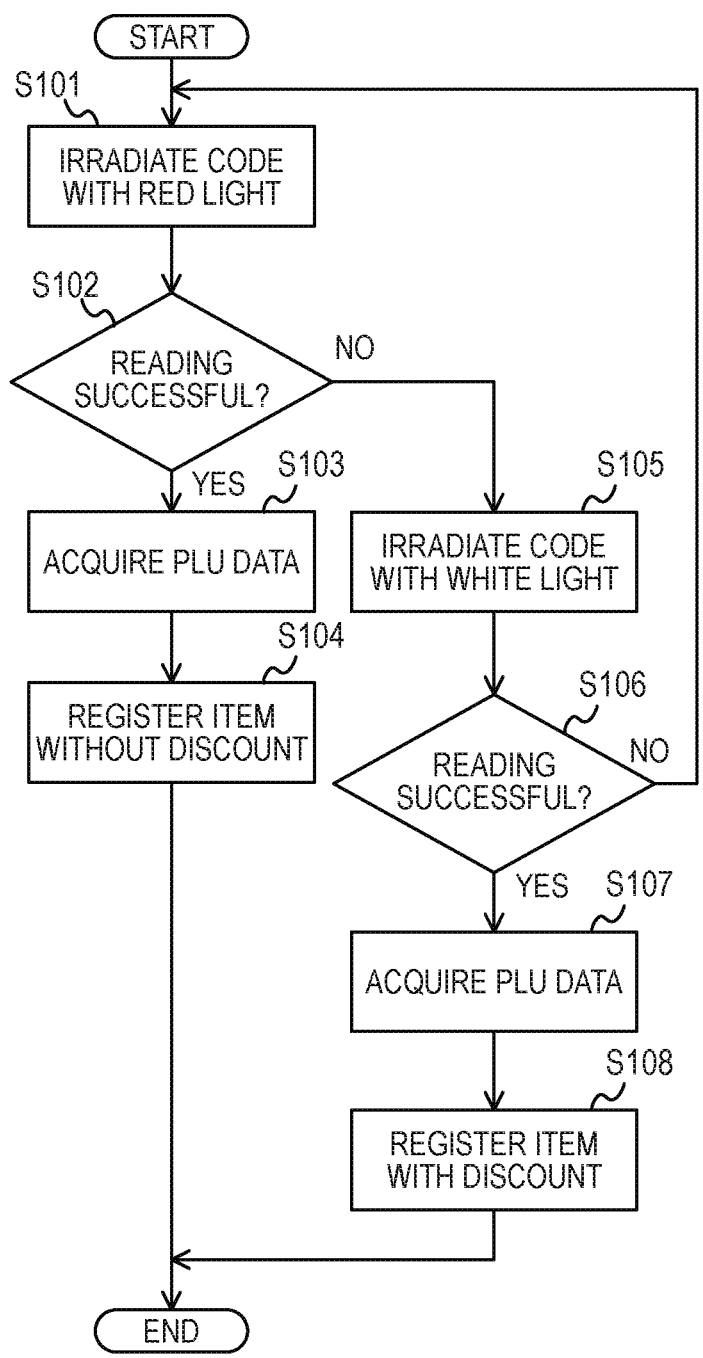
FIG. 8A is a diagram illustrating a flowchart of the code reading method according to the first example embodiment.
Figure 8B:
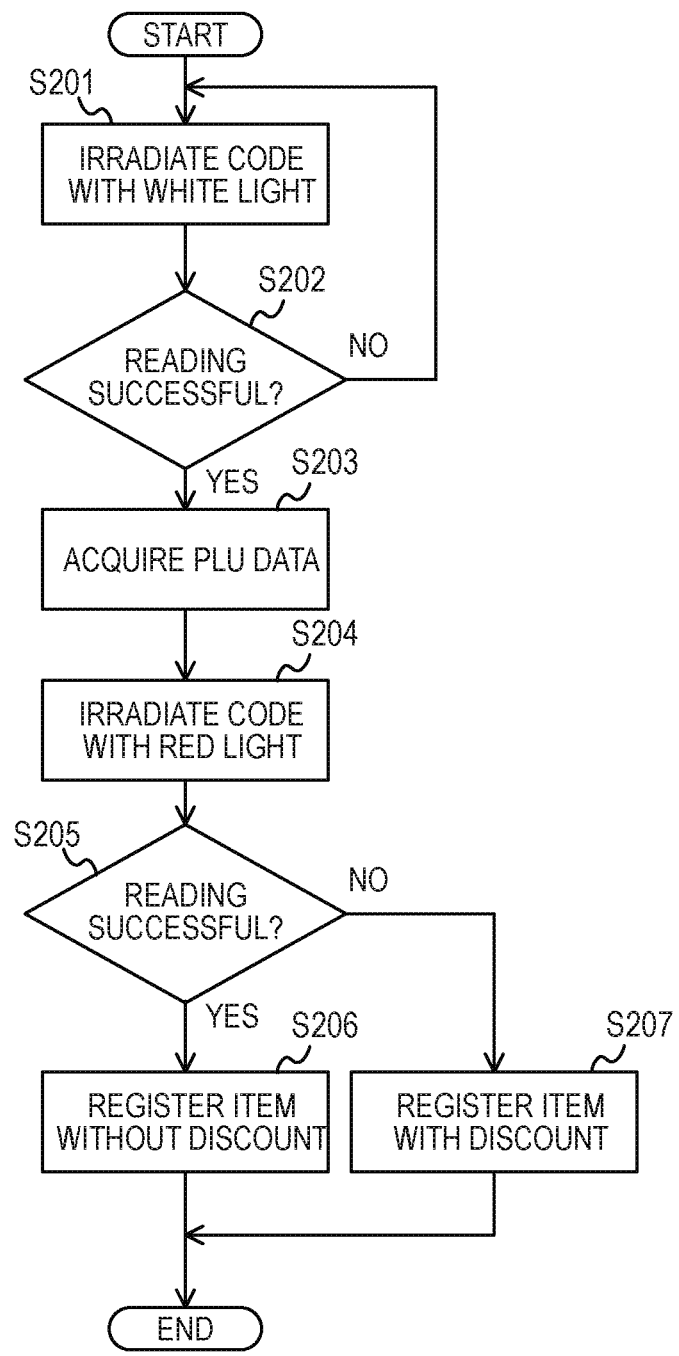
FIG. 8B is a diagram illustrating a flowchart of the code reading method according to the first example embodiment.

The POS terminal 100 (code reading device) according to the present example embodiment performs code reading by utilizing the phenomenon of FIG. 6 and FIG. 7. FIG. 8A and FIG. 8B are diagrams illustrating flowcharts of the code reading method according to the present example embodiment. The code reading method is started by the shop assistant performing an operation to start reading of a code attached to the item on the POS terminal 100, for example. FIG. 8A illustrates a form of performing reading by using a white light after performing reading by using a red light, FIG. 8B illustrates a form of performing reading by using a red light after performing reading by using a white light.

In the flowchart of FIG. 8A, first, the light color control unit 110 irradiates the code A with a red light by controlling the code scanner 10 (step S101). The code reading unit 120 then receives, from the code scanner 10, a signal indicating a light from the code A and decodes the light from the code A with a predetermined rule. As a result of decoding, if the information of the code A is read with the red light (step S102, YES), the discount processing unit 140 determines to make no discount. The item information acquisition unit 130 acquires item information (PLU data) from the PLU server 30 based on an identifier of an item read from the code A (step S103), and the discount processing unit 140 registers the item information as a payment subject without a discount (step S104).

As a result of decoding, if the information of the code A is not read with the red light (step S102, NO), the light color control unit 110 then controls the code scanner 10 to irradiate the code A with a white light (step S105). The code reading unit 120 receives, from the code scanner 10, a signal indicating a light from the code A and decodes the light from the code A with a predetermined rule. As a result of decoding, if the information of the code A is read with the white light (step S106, YES), the discount processing unit 140 determines to make a discount. The item information acquisition unit 130 acquires item information (PLU data) from the PLU server 30 based on the identifier of the item read from the code A (step S107), the discount processing unit 140 registers the item information as a payment subject after applying a predetermined discount thereto (for example, a 50% discount) (step S108). If the information of the code A is not read with the white light (step S106, NO), the process returns to step S101, and reading of the code A is repeated.

In the flowchart of FIG. 8B, first, the light color control unit 110 controls the code scanner 10 to irradiate the code A with a white light (step S201). The code reading unit 120 then receives, from the code scanner 10, a signal indicating a light from the code A and decodes the light from the code A with a predetermined rule. As a result of decoding, if the information of the code A is not read with the white light (step S202, NO), the process returns to step S201, and reading of the code A is repeated.

As a result of decoding, if the information of the code A is read with the white light (step S202, YES), the item information acquisition unit 130 acquires item information (PLU data) from the PLU server 30 based on an identifier of an item read from the code A (step S203). Next, the light color control unit 110 controls the code scanner 10 to irradiate the code A with a red light (step S204). The code reading unit 120 receives, from the code scanner 10, a signal indicating a light from the code A and decodes the light from the code A with a predetermined rule. As a result of decoding, if the information of the code A is read with the red light (step S205, YES), the discount processing unit 140 determines to make no discount and registers the item information acquired in step S203 as a payment subject without a discount (step S206).

As a result of decoding, if the information of the code A is not read with the red light (step S205, NO), the discount processing unit 140 determines to make a discount and registers the item information acquired in step S203 as a payment subject after applying a predetermined discount thereto (for example, a 50% discount) (step S207).

The flowcharts of FIG. 8A and FIG. 8B are examples, and the order or the content of the steps may be changed as appropriate unless the function of the present example embodiment is impaired.

The CPU 101 of the POS terminal 100 serves as a subject of each step (process) included in the code reading method illustrated in FIG. 8A and FIG. 8B. That is, the CPU 101 reads a code reading program used for performing the code reading method illustrated in FIG. 8A and FIG. 8B from the memory 102 or the storage device 103, executes the program to control each unit of the POS terminal 100, and thereby performs the code reading method illustrated in FIG. 8A and FIG. 8B.

In the present example embodiment, the POS terminal 100 is used as the code reading device. As another method, when the stationary type code scanner 10 of FIG. 4 is used, the stationary type code scanner 10 may be used as the code reading device. In such a case, the CPU 13 of the code scanner 10 executes the program stored in the storage device 15, thereby functions as the light color control unit 110, the code reading unit 120, the item information acquisition unit 130, and the discount processing unit 140, and serves as a subject of each step (process) included in the code reading method illustrated in FIG. 8A and FIG. 8B.

According to the present example embodiment, the POS terminal 100 can easily recognize that the discount line B is drawn on the code A and acquire information represented by the code A. The POS terminal 100 then can determine that the item is a discount subject in accordance with the presence or absence of the discount line B on the code A. Since it is not necessary for a shop assistant to attach a seal indicating a discount to an item for making a discount or print a label including the post-discount code A, it is possible to reduce workload in making a discount. Further, since a discount is automatically made by only causing the code scanner 10 to read the code A without requiring the shop assistant to perform a particular operation on the POS terminal 100, an oversight or an input error of a discount can be prevented.

Second Example Embodiment

While the code A is read by using a red light and a white light to the blue-green discount line B in the first example embodiment, the color of a discount line and the color of a light that are available in the present invention are not limited thereto. In the present example embodiment, the color of a discount line and the color of a light that are available in the present invention will be described. In the present example embodiment, the POS terminal 100 having the same configuration as that of the first example embodiment is used.

FIG. 9 is a diagram illustrating a table as to whether or not reading is successful for each combination of colors of a discount line B drawn on the code A and colors of a light used in reading. The color of a light corresponds to a wavelength of the light, and the wavelength region of each color conforms to a known definition. Further, the color of the discount line B corresponds to a wavelength of the light reflected by the discount line B, and the wavelength region of each color conforms to a known definition.

FIG. 9 illustrates an expected result of reading when one draws the discount lines B on the code A by pens of red, green, and blue that are the three primary colors of light and tries to read the code A by using a red light, a green light, a blue light, and a white light. In the table of FIG. 9, a mark "circle" is placed when the information of the code A is read, and a mark "cross" is placed when the information is not read.

In the first example embodiment, the code A is irradiated with lights of two different colors, and the presence of the discount line B is detected to make a discount when the information of the code A is not read with a light of one of the colors (first light) but is read with a light of the other color (second light). That is, the first example embodiment is realized by using a light of a color which enables reading and a light of a color which disables reading on a particular color of line in FIG. 9. For example, in the case of the red discount line B, a combination of a red light and a blue light, a combination of a red light and a green light, a combination of a white light and a blue light, and a combination of a white light and a green light can be used from FIG. 9. For the green discount line B and the blue discount line B, a plurality of combinations of color lights can be used in a similar manner.

While red, green, blue, and white are used here as the colors of lights used for irradiating the code A, the color is not limited thereto. As colors of lights used for irradiating the code A, lights of any colors can be used which are distinguishable in accordance with the characteristics of the light receiving element 12 of the code scanner 10. Further, also for the color of the discount line B, lines of any colors can be used which are distinguishable in accordance with the characteristics of the light receiving element 12 of the code scanner 10 without being limited to red, green, and blue.

Third Example Embodiment

While the discount line B corresponding to the three primary colors of light is used in the first and second example embodiments, the discount line B of an intermediate color generated by mixing the three primary colors of light at a predetermined ratio can also be utilized in the present invention. In the present example embodiment, a process performed when the discount line B of an intermediate color is used will be described. In the present example embodiment, the POS terminal 100 having the same configuration as that of the first and second example embodiments is used.

As an example here, the discount line B of an intermediate color generated at a ratio of red 50%, green 50%, and blue 100% is used. The ratio of each color corresponds to a reflection rate of a light of the color of interest, a white light is obtained when each of all the colors is at 100%. The ratio of each color included in an intermediate color is not limited to the above, any ratio may be set. A method of detecting the discount line B of an intermediate color by using the light emitting element 11 having no dimming function of emitting a red light, a green light, and a blue light will be described below.

Figure 10:
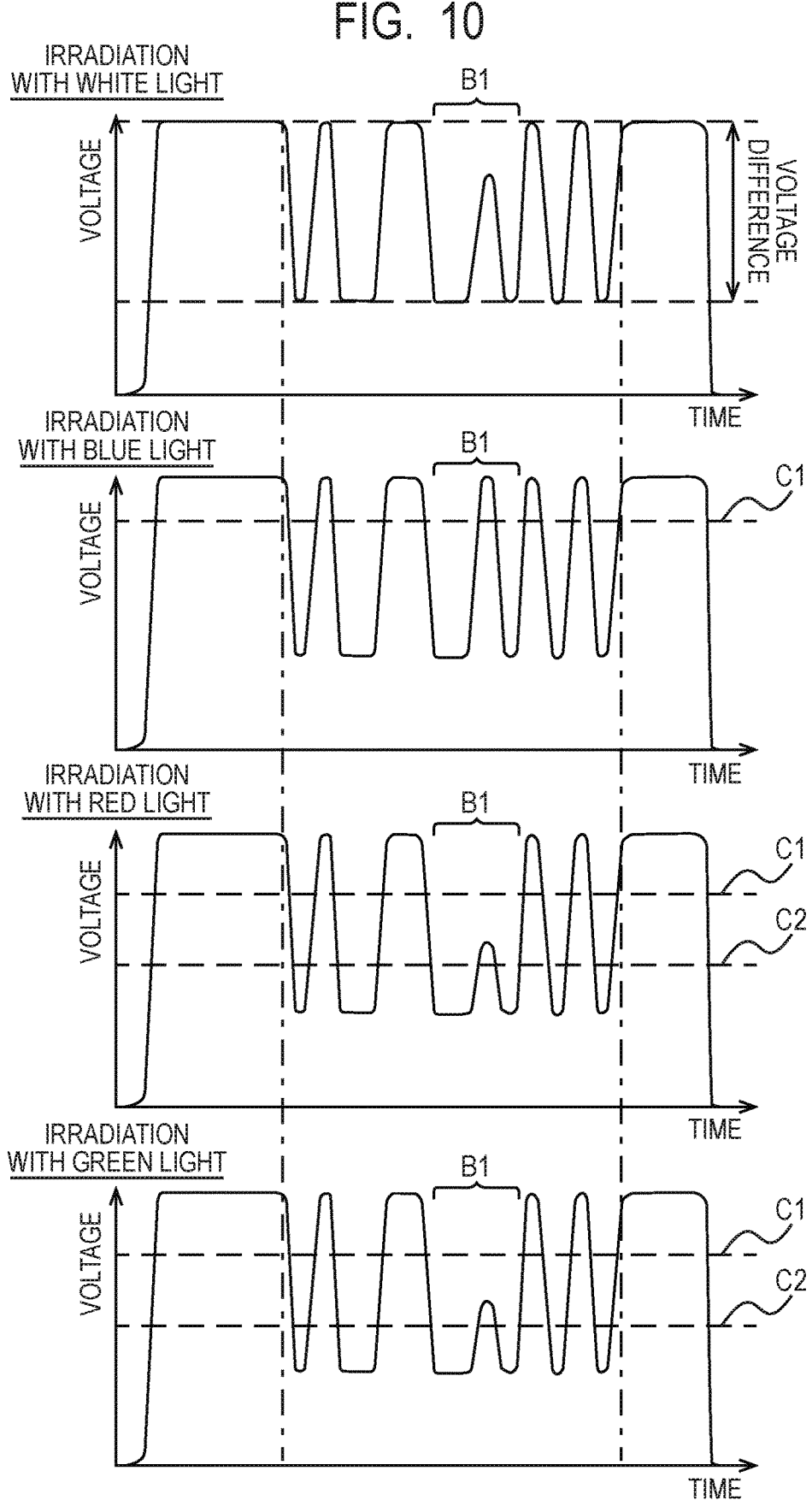
FIG. 10 is a diagram illustrating a graph of the light reception intensity according to a code reading method according to a third example embodiment.

FIG. 10 is a diagram illustrating a graph of the light reception intensity by the code reading method according to the present example embodiment. The light reception intensity is measured by the light receiving element 12 of the code scanner 10. FIG. 10 illustrates graphs of the light reception intensities (voltages) when the discount line B of an intermediate color is irradiated with a white light, a blue light, a red light, or a green light, respectively. The left and right positions in each graph of FIG. 10 correspond to the left and right positions in the code A and the discount line B on the upper stage of FIG. 7. In each graph of FIG. 10, a range B1 corresponding to the position of the discount line B is illustrated.

When a white light is emitted, the maximum voltage difference obtained by subtracting the minimum value from the maximum value of the voltage of a range corresponding to the code A in the graph is calculated. That is, this maximum voltage difference corresponds to a difference in the output voltage between a region of a space and a region of a line of the code A. The maximum voltage difference is used for setting a threshold used for distinguishing a region of a space and a region of a line of the code A. Here, a high threshold C1 (first threshold) that is 70% of the maximum voltage difference and a low threshold C2 (second threshold) that is 30% of the maximum voltage difference are set. The maximum voltage difference may be pre-recorded before the code reading method is performed or may be calculated every time the code reading method is performed.

When irradiated with a blue light, since the discount line B of an intermediate color reflects 100% of the blue light, the voltage for the region of the space included in the range B1 of the discount line B rises to the same level as other regions of spaces and is higher than the high threshold C1. That is, when a blue light is emitted, the information of the code A can be read by using each of the high threshold C1 and the low threshold C2.

When irradiated with a red light or a green light, since the discount line B of the intermediate color reflects the red light and the green light by 50%, the voltage rises to around 50% of the maximum voltage difference in the region of the space included in the region B1 of the discount line B and is below the high threshold C1 and above the low threshold C2. That is, when the red light or the green light is emitted, no information of the code A can be read when the high threshold C1 is used, but the information of the code A can be read when the low threshold C2 is used.

Figure 11:
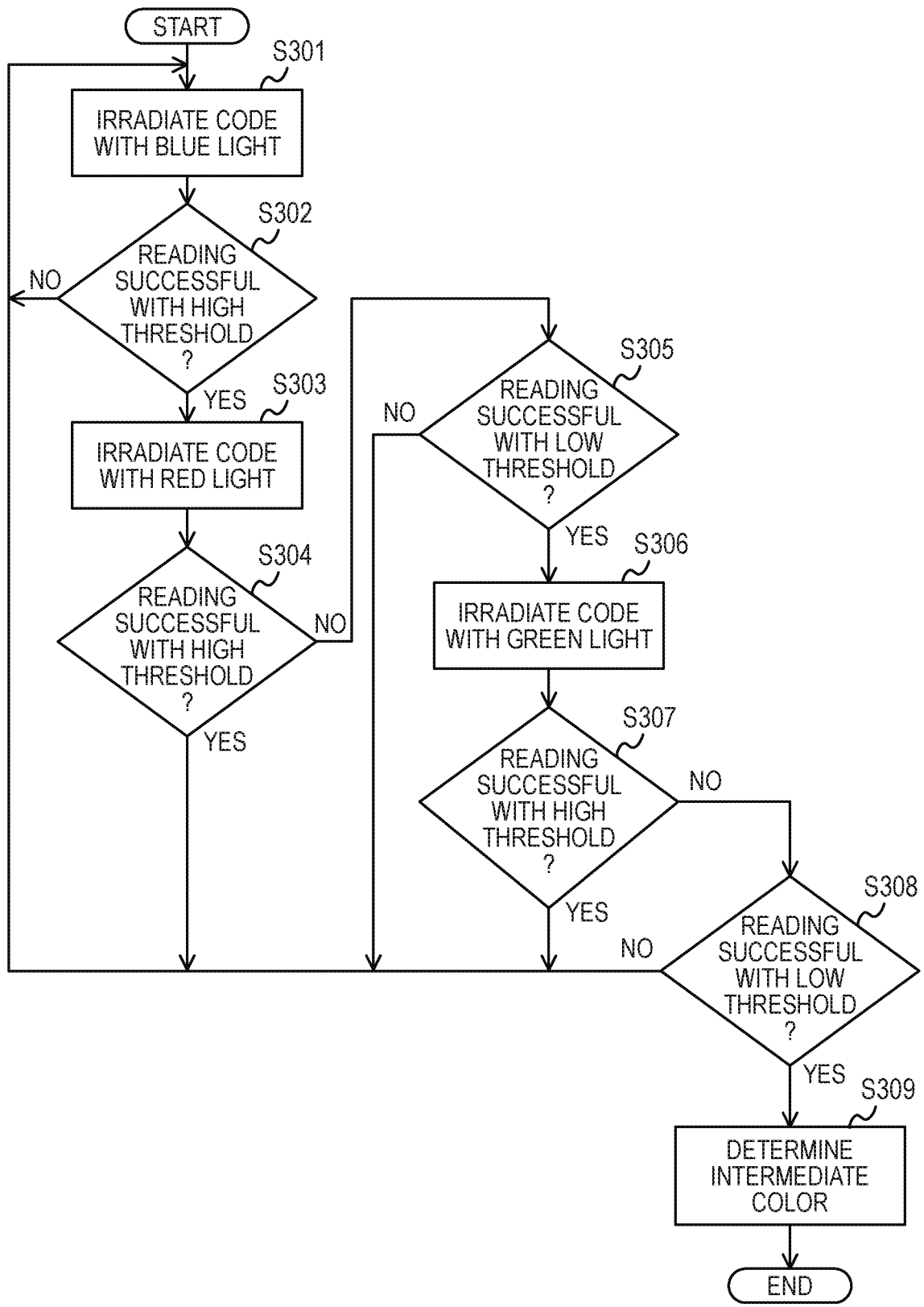
FIG. 11 is a diagram illustrating a flowchart of the code reading method according to the third example embodiment.

The POS terminal 100 (code reading device) according to the present example embodiment determines an intermediate color by utilizing the phenomenon of FIG. 10. FIG. 11 is a diagram illustrating a flowchart of the code reading method according to the present example embodiment. The code reading method is started by a shop assistant performing an operation to start reading of a code attached to the item on the POS terminal 100, for example.

First, the light color control unit 110 controls the code scanner 10 to irradiate the code A with a blue light (step S301). The code reading unit 120 receives, from the code scanner 10, a signal indicating a light from the code A, sets a threshold used for distinguishing a region of a space and a region of a line of the code A to the high threshold C1 (here, 70% of the maximum voltage difference), and then decodes the light from the code A in accordance with a predetermined rule. As a result of decoding, if the information of the code A is not read with the high threshold C1 by using the blue light (step S302, NO), the process returns to step S301, and reading of the code A is repeated.

As a result of decoding, if the information of the code A is read with the high threshold C1 by using the blue light (step S302, YES), the light color control unit 110 then controls the code scanner 10 to irradiate the code A with a red light (step S303). The code reading unit 120 receives, from the code scanner 10, a signal indicating a light from the code A, sets thresholds used for distinguishing a region of a space and a region of a line of the code A to the high threshold C1 and the low threshold C2 (here, 30% of the maximum voltage difference), and then decodes the light from the code A in accordance with a predetermined rule, respectively. As a result of decoding, if the information of the code A is read with the high threshold C1 by using the red light (step S304, YES) or if the information of the code A is neither read with the high threshold C1 nor the low threshold C2 by using the red light (step S304, NO, step S305, NO), the process returns to step S301, and reading of the code A is repeated.

As a result of decoding, if the information of the code A is not read with the high threshold C1 by using the red light but the information of the code A is read with the low threshold C2 (step S304, NO, step S305, YES), the light color control unit 110 then controls the code scanner 10 to irradiate the code A with a green light (step S306). The code reading unit 120 receives, from the code scanner 10, a signal indicating a light from the code A, sets thresholds used for distinguishing a region of a space and a region of a line of the code A to the high threshold C1 and the low threshold C2, and then decodes the light from the code A in accordance with a predetermined rule, respectively. As a result of decoding, if the information of the code A is read with the high threshold C1 by using the green light (step S307, YES) or if the information of the code A is neither read with the high threshold C1 nor the low threshold C2 by using the green light (step S307, NO, step S308, NO), the process returns to step S301, and reading of the code A is repeated.

As a result of decoding, if the information of the code A is not read with the high threshold C1 by using the green light but the information of the code A is read with the low threshold C2 (step S307, NO, step S308, YES), the code reading unit 120 determines that the discount line B of the intermediate color is present (step S309).

While including only the determination for an intermediate color, the flowchart of FIG. 11 is used practically as a part of the code reading method such as FIG. 8A or FIG. 8B, and a predetermined discount is made when the presence of the discount line B of an intermediate color is determined, for example. The flowchart of FIG. 11 is an example, and the order or the content of the steps may be changed as appropriate unless the function of the present example embodiment is impaired.

In such a way, by determining whether or not reading is successful by using a plurality of thresholds when a red light, a blue light, and a green light are emitted, respectively, it is possible to detect the discount line B of an intermediate color obtained by mixing red, blue, and green even when the light emitting element 11 having no dimming function of emitting a red light, a blue light, and a green light is used.

When determination of an intermediate color is enabled as with the present example embodiment, the color of a pen or a stamp used for drawing the discount line B on the code A can be a special color that is not commercially available. With the use of the configuration that needs a pen or a stamp of a less available special color in such a way, it is possible to make it difficult for a malicious customer to draw the discount line B on the code A by itself and wrongly receive a discount.

The high threshold C1 and the low threshold C2 that is smaller than the high threshold C1 illustrated here are examples, it is possible to determine any intermediate color by changing the high threshold C1 and the low threshold C2 in accordance with an intermediate color to be determined. The high threshold C1 and the low threshold C2 for a red light, a green light, and a blue light may be the same or may be different from each other.

For example, in the first example embodiment, a combination of a light of an intermediate color and a light of a white color may be used to determine whether or not reading is successful. Alternatively, a combination of a light of a first intermediate color and a light of a second intermediate color that is different from the first intermediate color may be used to determine whether or not reading is successful.

While the configuration in which the light emitting element 11 of the code scanner 10 has no dimming function for each color has been described in the present example embodiment, it is possible to perform determination on an intermediate color even with a use of a configuration in which the light emitting element 11 has a dimming function for each color. In such a case, the light color control unit 110 controls the code scanner 10 to irradiate the code A with a light of the same color as an intermediate color (here, red 50%, green 50%, blue 100%) used for the discount line B and a light of a complementary color (red 50%, green 50%, blue 0%) of the intermediate color. At this time, while the information of the code A is read with the light of the same color as the intermediate color, the information of the code A is not read with the light of the complementary color of the intermediate color. Thereby, the discount line B of the intermediate color can be detected.

Fourth Example Embodiment

The first to third example embodiments apply a predefined discount to an item on which the discount line B is drawn is drawn on code A. In contrast, the present example embodiment applies, to an item on which the discount line B is drawn, different discounts in accordance with the color of a light with which the information of the code A can be read. In the present example embodiment, the POS terminal 100 having the same configuration as that in the first to third example embodiments is used.

Figure 12:
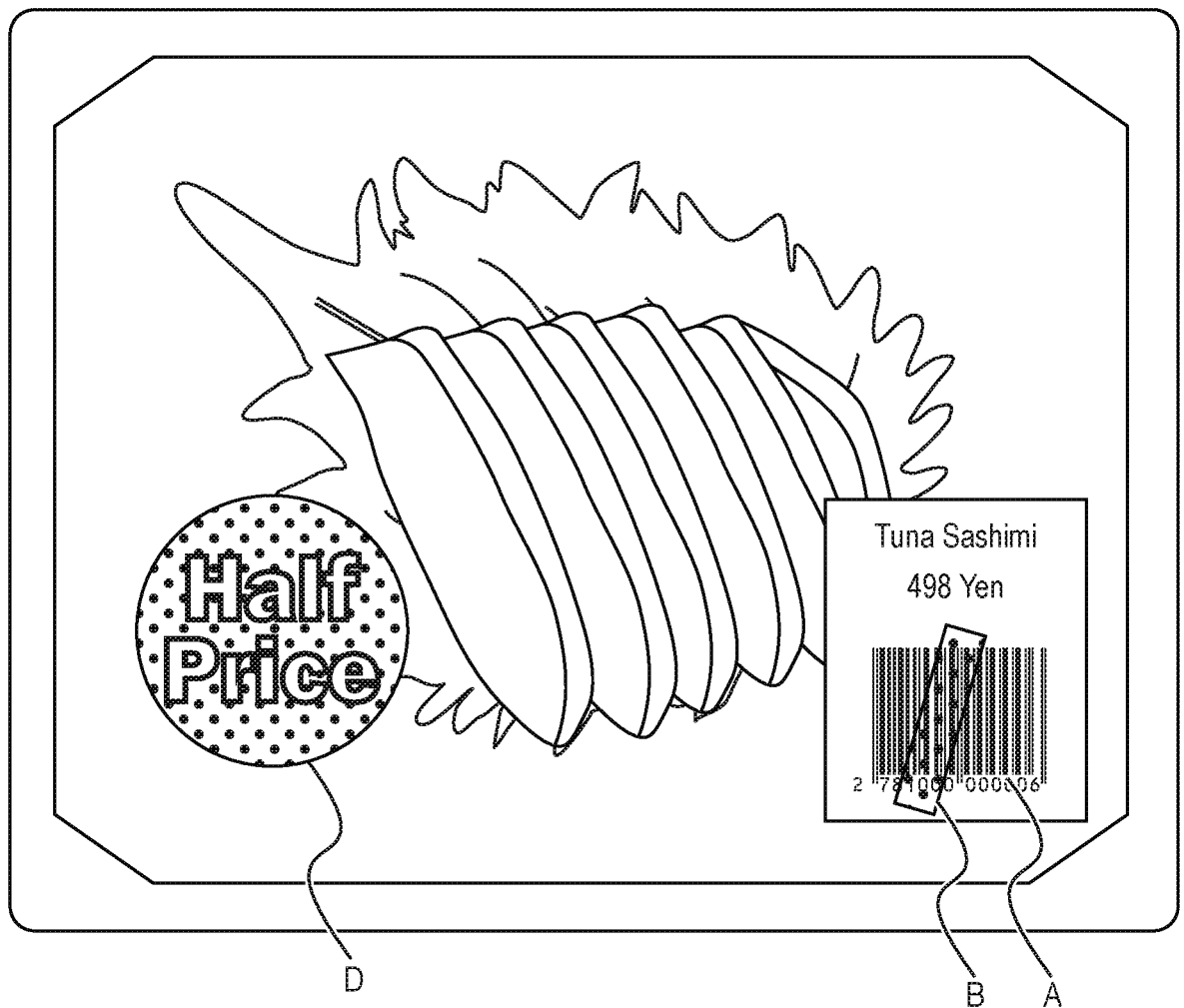
FIG. 12 is a top view of an item to which an exemplary code used in a fourth example embodiment is attached.

FIG. 12 is a top view of an item to which an exemplary code A used in the present example embodiment is attached. A label including the code A illustrated in FIG. 5 is attached to an item, and the discount line B illustrated in FIG. 5 is drawn on the code A. Further, a discount seal D is attached to an item. The discount seal D includes a character string indicating a discount rate or a discount price. The background of the character string on the discount seal D is painted in the same color as or a similar color to the discount line B.

In the present example embodiment, since a discount is made in accordance with the color of a light with which the information of the code A can be read, when a certain discount is made on an item, the discount line B of a color corresponding to the discount is drawn on the code A. The POS terminal 100 attempts reading by using lights of multiple different colors and applies, to the item, a discount associated with the color of a light, out of the lights, with which the information of the code A can be read.

FIG. 13 is a diagram illustrating a table of discounts applied to respective combinations of colors of the discount line B drawn on the code A and colors of a light used in reading. The color of a light corresponds to the wavelength of the light, and the wavelength region of each color conforms to a known definition. Further, the color of the discount line B corresponds to the wavelength of a light reflected by the discount line B, and the wavelength region of each color conforms to a known definition.

FIG. 13 illustrates an expected result of reading when one draws the discount line B on the code A by using pens of red, green, and blue that are three primary colors of light and tries to read the code A by using a red light, a green light, and a blue light. In the table of FIG. 13, a mark "circle" is placed when the information of the code A is read, and a mark "cross" is placed when the information of the code A is not read. Furthermore, in the table of FIG. 13, a discount associated with a color of a light with which reading is successful is indicated. While a discount rate is used here as a discount, a discount price or a price after discount may be used.

Specifically, when the price of an item is discounted by 50%, a shop assistant draws a red discount line B on the code A attached to the item and attaches a red discount seal D including a character string "half price" to the item. When the price of an item is discounted by 30%, a shop assistant draws a blue discount line B on the code A attached to the item and attaches a blue discount seal D including a character string "30% discount" to the item. When the price of an item is discounted by 20%, a shop assistant draws a green discount line B on the code A attached to the item and attaches a green discount seal D including a character string "20% discount" to the item. The POS terminal 100 irradiates the code A with a red light, a blue light, and a green light, determines that the discount line B is drawn when the information of the code A is read by only one color light of the red light, the blue light, and the green light, and sells the item by applying a discount associated with the color of the light with which the reading is successful. On the other hand, the POS terminal 100 determines that no discount line B is drawn when the information of the code A is read with lights of two or more colors (for example, the red light and the blue light) and sells the item without discount. The discount for each combination illustrated in FIG. 13 is one example, and any discount is predefined in the POS terminal 100.

A customer is unable to know the details of a discount from the appearance of the color of the discount line B. Thus, in the present example embodiment, by attaching the discount seal D of the same color as the discount line B to the item together with the discount line B, it is possible to inform a customer of a discount rate or a discount price applied by the discount line B. Further, by comparing the color of the discount line B and the character string of the discount seal D, a shop assistant is able to recognize an error of a discount. Furthermore, with the color of the discount line B and the color of the discount seal D having the same color or similar colors, easier discovery of an error of a discount is possible.

Figure 14A:
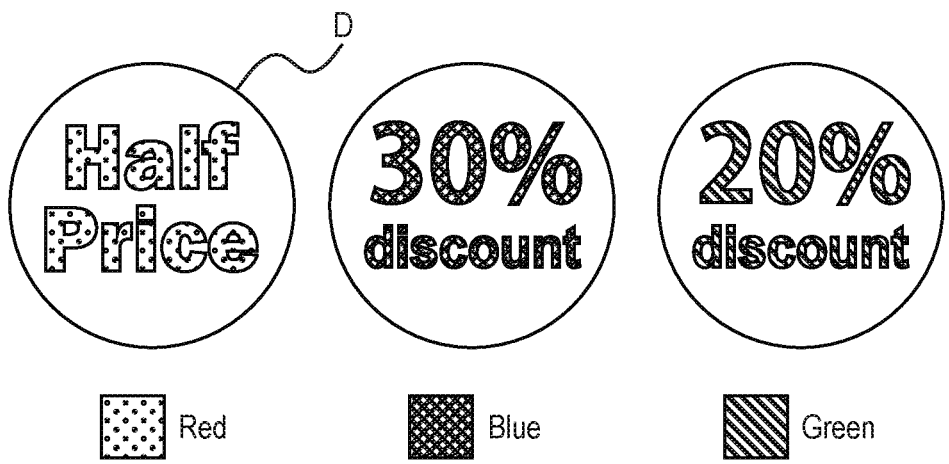
FIG. 14A is a front view of a discount seal of a modified example.
Figure 14B:
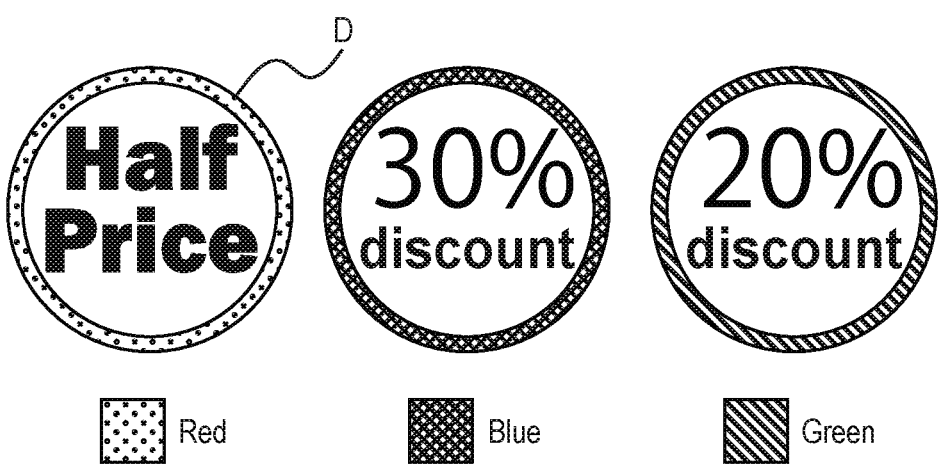
FIG. 14B is a front view of a discount seal of a modified example.

While the background color of the discount seal D has the same color as or a similar color to the discount line B in the example of FIG. 12, the color of another part of the discount seal D may be changed. FIG. 14A and FIG. 14B are front views of the discount seal D of modified examples. Representation of each color in the figure is illustrated as a legend under each of the FIG. 14A and FIG. 14B. In the discount seal D of FIG. 14A, the color of the character string itself indicating a discount is the same color as or a similar color to the color of the discount line B. In the discount seal D of FIG. 14B, the outer edge of the discount seal D is the same color as or a similar color to the color of the discount line B. In such a way, with at least a part of the discount seal D having the same color as or a similar color to the color of the discount line B, it is possible to easily discover an error by performing comparison with the discount line B.

Figure 15:
FIG. 15 is a front view of a notice illustrating details of discounts according to the fourth example embodiment.

While a customer is notified of the detail of a discount by a character string representing a discount included in the discount seal D in the present example embodiment, other methods may be used for notification. FIG. 15 is a front view of a notice E indicating the detail of a discount according to the present example embodiment. The notice E is provided inside a shop and displays a discount rate or a discount price corresponding to each color of the discount line B. With such a configuration, it is possible to notify a customer of the detail of the discount indicated by the discount line B while reducing labor and cost to attach the discount seal D to an item. Alternatively, a shop assistant may convey the discount rate or the discount price orally to a customer and then hand over the item on which the discount line B is drawn.

Figure 16:
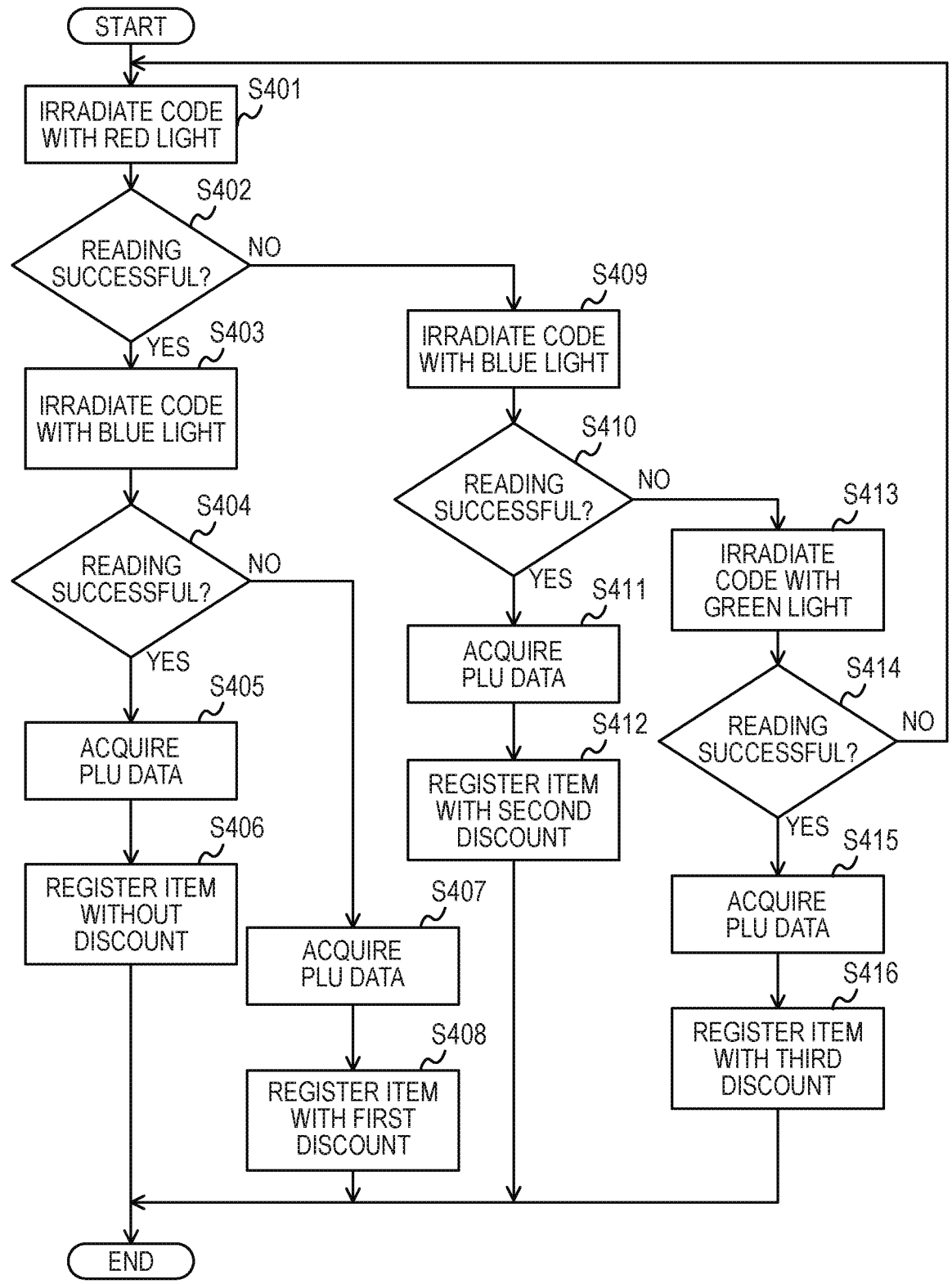
FIG. 16 is a diagram illustrating a flowchart of a code reading method according to the fourth example embodiment.

FIG. 16 is a diagram illustrating a flowchart of the code reading method according to the present example embodiment. The code reading method is started by a shop assistant performing an operation to start reading of a code attached to an item on the POS terminal 100, for example.

First, the light color control unit 110 controls the code scanner 10 to irradiate the code A with a red light (step S401). The code reading unit 120 then receives, from the code scanner 10, a signal indicating a light from the code A and decodes the light from the code A in accordance with a predetermined rule. As a result of decoding, if the information of the code A is read with the red light (step S402, YES), the light color control unit 110 then controls the code scanner 10 to irradiate the code A with a blue light (step S403). Since step S403 intends to determine whether or not the reading is successful with lights of a plurality of colors, a green light instead of the blue light may be emitted. As a result of decoding, if the information of the code A is read with the red light and the blue light (step S404, YES), the discount processing unit 140 determines to make no discount. The item information acquisition unit 130 acquires item information (PLU data) from the PLU server 30 based on an identifier of the item read from the code A (step S405), and the discount processing unit 140 registers the item information as a payment subject without discount (step S406).

As a result of decoding, if the information of the code A is read with the red light but not read with the blue light (step S404, NO), the discount processing unit 140 determines to make a discount. The item information acquisition unit 130 acquires item information (PLU data) from the PLU server 30 based on an identifier of the item read from the code A (step S407), and the discount processing unit 140 applies a first discount (for example, a 50% discount) corresponding to the red light with which the reading is successful and then registers the item information as a payment subject (step S408).

As a result of decoding, if the information of the code A is not read with the red light (step S402, NO), the light color control unit 110 then controls the code scanner 10 to irradiate the code A with a blue light (step S409). The code reading unit 120 receives, from the code scanner 10, a signal indicating a light from the code A and decodes the light from the code A in accordance with a predetermined rule. As a result of decoding, if the information of the code A is read with the blue light (step S410, YES), the discount processing unit 140 determines to make a discount. The item information acquisition unit 130 acquires item information (PLU data) from the PLU server 30 based on an identifier of the item read from the code A (step S411), and the discount processing unit 140 applies a second discount (for example, a 30% discount) corresponding to the blue light with which the reading is successful and then registers the item information as a payment subject (step S412).

As a result of decoding, if the information of the code A is not read with the blue light (step S410, NO), the light color control unit 110 then controls the code scanner 10 to irradiate the code A with a green light (step S413). The code reading unit 120 receives, from the code scanner 10, a signal indicating a light from the code A and decodes the light from the code A in accordance with a predetermined rule. As a result of decoding, if the information of the code A is read with the green light (step S414, YES), the discount processing unit 140 determines to make a discount. The item information acquisition unit 130 acquires item information (PLU data) from the PLU server 30 based on an identifier of the item read from the code A (step S415), and the discount processing unit 140 applies a third discount (for example, a 20% discount) corresponding to the green light with which the reading is successful and then registers the item information as a payment subject (step S416).

If the information of the code A is not read with the green light (step S414, NO), the process returns to step S401, and reading of the code A is repeated.

The flowchart of FIG. 16 is an example, and the order or the content of the steps may be changed as appropriate unless the function of the present example embodiment is impaired.

The CPU 101 of the POS terminal 100 (or the CPU 13 of the code scanner 10) serves as a subject of each step (process) included in the code reading method illustrated in FIG. 16. That is, the CPU 101 reads a code reading program used for performing the code reading method illustrated in FIG. 16 from the memory 102 or the storage device 103, executes the program to control each unit of the POS terminal 100, and thereby performs the code reading method illustrated in FIG. 16.

While the colors of the discount line B are red, blue, and green in the present example embodiment, other colors (for example, the intermediate color described in the third example embodiment) may be used. Further, while the background color of the code A is white, another color may be used, and in such a case, the threshold used in reading may be changed as appropriate.

As described above, since different discounts can be made for respective colors of lights with which reading of the information of the code A is successful in the present example embodiment, various discounts are applicable in accordance with the color of the discount line B.

Fifth Example Embodiment

While the fourth example embodiment assumes that the discount line B of a single color is drawn on the code A, the present example embodiment performs a process to address a situation where the discount lines B of a plurality of colors are drawn on the code A. Thereby, when closing time or best-before date approaches, for example, the discount line B corresponding to another discount can be newly drawn on the item on which the discount line B corresponding to one discount has been drawn. In the present example embodiment, the POS terminal 100 having the same configuration as that of the fourth example embodiment is used.

Figure 17:
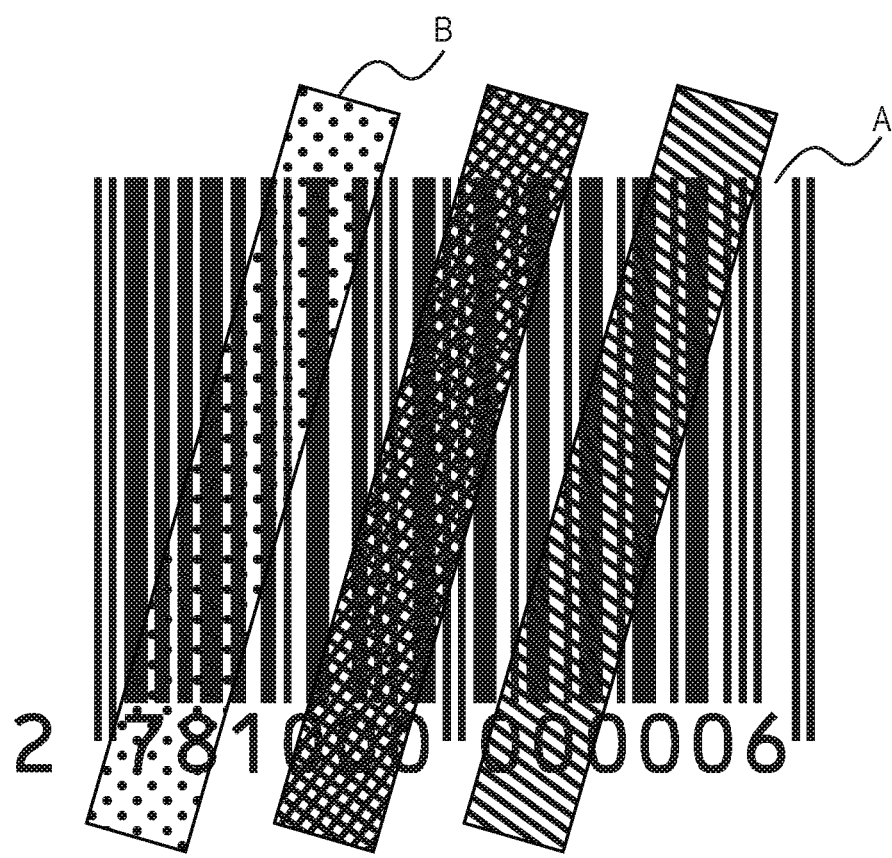
FIG. 17 is a front view of an exemplary code according to a fifth example embodiment.

FIG. 17 is a front view of an exemplary code A used in the present example embodiment. In the present example embodiment, the code A and the discount line B similar to those in FIG. 5 are used. The discount lines B of one or a plurality of colors may be drawn on the code A. The representation of each color in FIG. 17 is the same as that in FIG. 14A and FIG. 14B. While the plurality of discount lines B are drawn without an overlap with each other on the code A in FIG. 17, the plurality of discount lines B may be drawn so as to at least partially overlap with each other.

The graph of the light reception intensity when a single discount line B is drawn on the code A is the same as illustrated in FIG. 7. In such a case, in the same manner as the first example embodiment, when the information of the code A is not read with one single-color light (a light of a different color from the discount line B in this example) but is read with another single-color light (a light of the same color as the discount line B in this example), the POS terminal 100 detects the presence of the discount line B of a color corresponding to the color of the single-color light with which the reading is successful and makes a discount. When the information of the code A is not read with any of the single-color lights, the POS terminal 100 determines that the discount lines B of two or more colors may be drawn.

Figure 18:
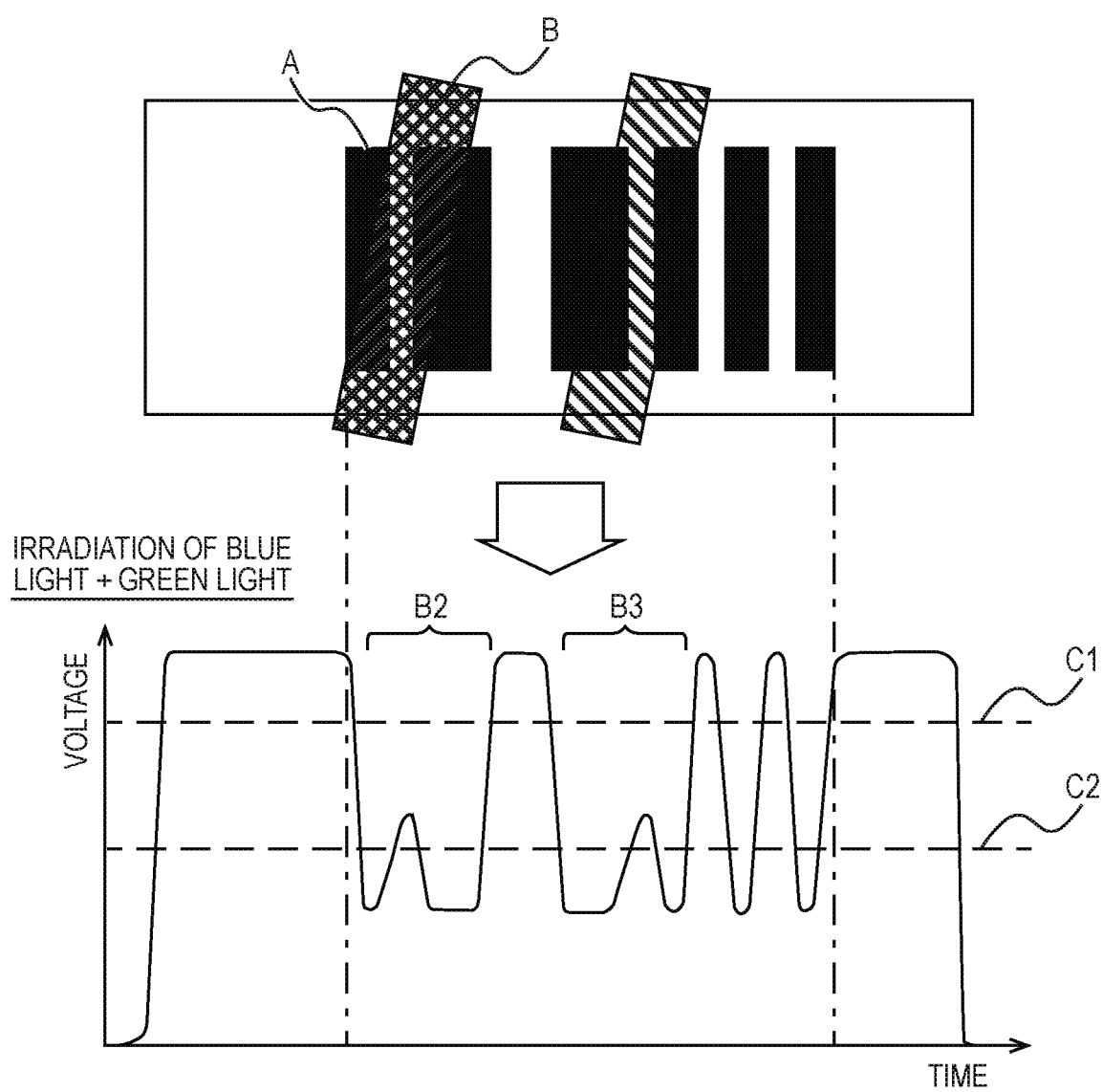
FIG. 18 is a diagram illustrating a graph of the light reception intensity according to a code reading method according to the fifth example embodiment.

FIG. 18 is a diagram illustrating a graph of the light reception intensity when two discount lines B are drawn on the code A. The light reception intensity is measured by the light receiving element 12 of the code scanner 10. The upper stage of FIG. 18 illustrates the code A on which two discount lines B of blue and green are drawn. The lower stage of FIG. 18 illustrates a graph of the light reception intensity (voltage) when the code A and the discount lines B of the upper stage are irradiated with a mixed light of a blue light and a green light. The left and right positions in the graph of the lower stage of FIG. 18 correspond to the left and right positions in the code A and the discount lines B on the upper stage. The graph illustrates a range B2 corresponding to the position of the blue discount line B and a range B3 corresponding to the position of the green discount line B.

In the graph of FIG. 18, the voltage is higher in the region of the space included in the region B2 of the blue discount line B than in the region of the line due to reflection of the blue light, and the voltage is higher in the region of the space included in the region B3 of the green discount line B than in the region of the line due to reflection of the green light. In the regions of the spaces of the ranges B2 and B3 of the discount line B, however, since only a part of the mixed light is reflected, respectively, the voltage is lower than in the space in the range in which no discount line B is drawn. Thus, in the reading using a mixed light, the POS terminal 100 determines regions of lines and regions of spaces in the code A by using a low threshold C2 (for example, 30% of the maximum voltage difference) that is lower than the high threshold C1 (for example, 70% of the maximum voltage difference) used in reading with a single-color light.

In such a way, when the information of the code A is not read with each single-color light but is read with a mixed light of lights of any two colors, the POS terminal 100 detects the presence of the discount lines B of two different colors corresponding to lights of two colors with which the reading is successful and makes a discount. While FIG. 18 illustrates the combination of blue and green, the same applies to a combination of other colors. When the information of the code A is not read with a mixed light of lights of any two colors, the POS terminal 100 determines that the discount lines B of three colors may be drawn.

Figure 19:
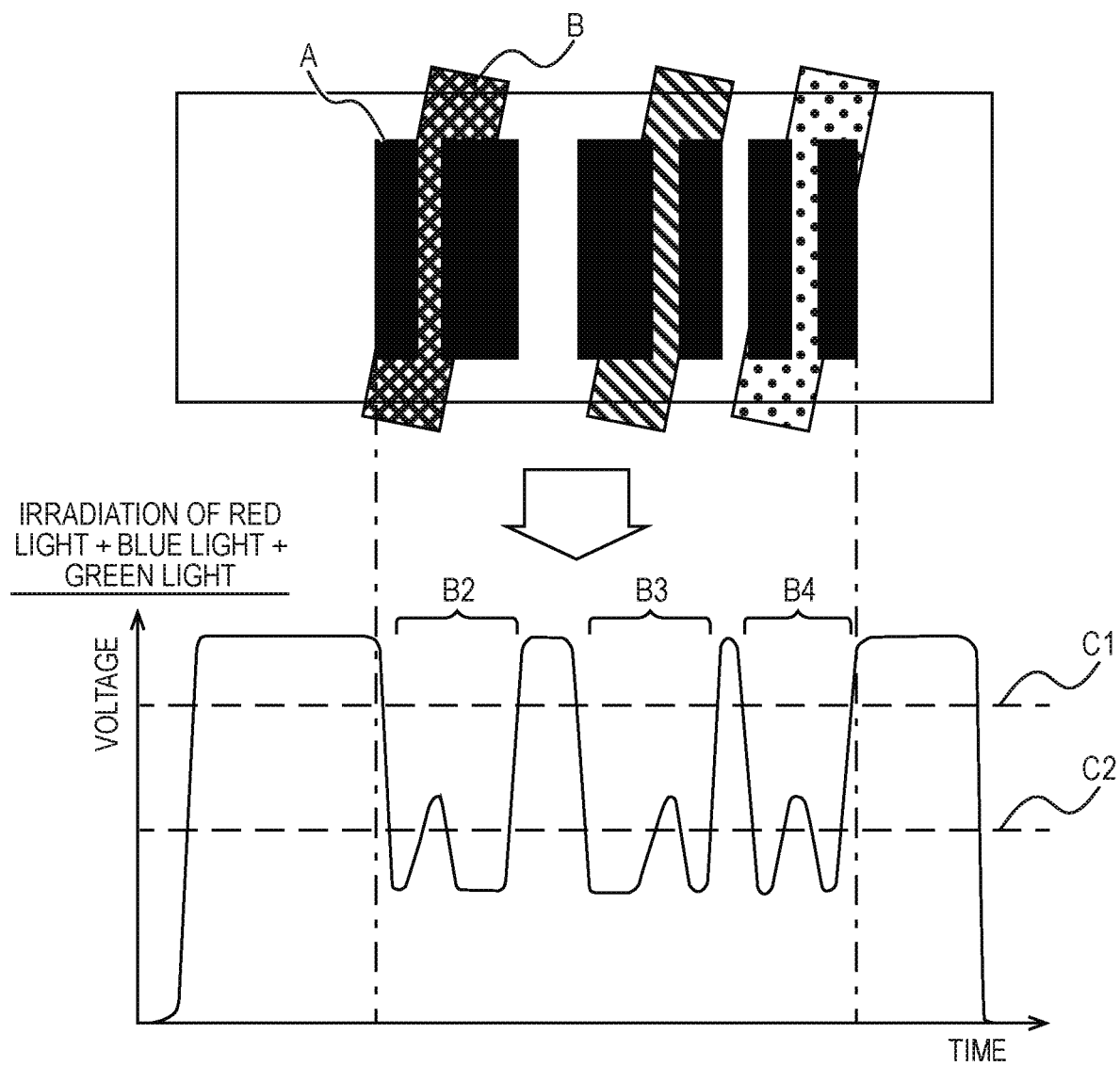
FIG. 19 is a diagram illustrating a graph of the light reception intensity according to the code reading method according to the fifth example embodiment.

FIG. 19 is a diagram illustrating a graph of the light reception intensity when three discount lines B are drawn on the code A. The light reception intensity is measured by the light receiving element 12 of the code scanner 10. The upper stage of FIG. 19 illustrates the code A on which three discount lines B of red, blue, and green are drawn. The lower stage of FIG. 19 illustrates a graph of the light reception intensity (voltage) when the code A and the discount lines B of the upper stage are irradiated with a mixed light of a red light, a blue light, and a green light (that is, a white light). The left and right positions in the graph of the lower stage of FIG. 19 correspond to the left and right positions in the code A and the discount lines B on the upper stage. The graph illustrates a range B2 corresponding to the position of the blue discount line B, a range B3 corresponding to the position of the green discount line B, and a range B4 corresponding to the position of the red discount line B.

In the graph of FIG. 19, the voltage is higher in the region of the space included in the region B2 of the blue discount line B than in the region of the line due to reflection of the blue light, the voltage is higher in the region of the space included in the region B3 of the green discount line B than in the region of the line due to reflection of the green light, and the voltage is higher in the region of the space included in the region B4 of the red discount line B than in the region of the line due to reflection of the red light. In the regions of the spaces of the ranges B2, B3, and B4 of the discount line B, however, since only a part of the mixed light is reflected, respectively, the voltage is lower than in the space in the range in which no discount line B is drawn. Thus, the POS terminal 100 determines regions of lines and regions of spaces in the code A by using a low threshold C2 (for example, 30% of the maximum voltage difference) that is lower than the high threshold C1 (for example, 70% of the maximum voltage difference) used in reading with a single-color light.

In such a way, when the information of the code A is not read with each single-color light, is not read with a mixed light of lights of two colors, but is read with a mixed light of lights of three colors (white light), the POS terminal 100 detects the presence of the discount lines B of three different colors and makes a discount. When the information of the code A is not read even with a mixed light of lights of three colors, the POS terminal 100 determines that the reading of the information of the code A failed and repeats reading of the information of the code A.

FIG. 20 is a diagram illustrating a table of discounts applied to respective combinations of colors of the discount lines B drawn on the code A and colors of lights used in reading. The color of a light corresponds to the wavelength of the light, and the wavelength region of each color conforms to a known definition. Further, the color of the discount line B corresponds to the wavelength of a light reflected by the discount line B, and the wavelength region of each color conforms to a known definition.

FIG. 20 illustrates an expected result of reading when one draws the discount line B on the code A by using pens of red, green, and blue that are three primary colors of light and tries to read the code A by using at least one of a red light, a green light, and a blue light. In the table of FIG. 20, a mark "circle" is placed when the information of the code A is read, and a mark "cross" is placed when the information of the code A is not read. Furthermore, in the table of FIG. 20, a discount associated with a color of a light (a single-color light or a mixed light) with which reading is successful is indicated. While a discount rate is used here as a discount, a discount price or a price after discount may be used.

Specifically, the POS terminal 100 makes a 50% discount when the information of the code A is read with a red light, a mixed light of a red light and a blue light, a mixed light of a red light and a green light, or a mixed light of a red light, a blue light, and a green light. The POS terminal 100 makes a 30% discount when the information of the code A is read with a blue light or a mixed light of a blue light and a green light. The POS terminal 100 makes a 20% discount when the information of the code A is read only with a green light. That is, when reading is successful with a mixed light of a plurality of colors, the largest discount is applied out of the discounts associated with the lights of the plurality of colors, respectively. When the information of the code A is read with a single-color light of two or more colors (a red light, a blue light, or a green light), the POS terminal 100 determines that no discount line B is drawn and sells the item without discount. The discount associated with each combination illustrated in FIG. 20 is one example, and any discount may be predefined in the POS terminal 100.

Figure 21:
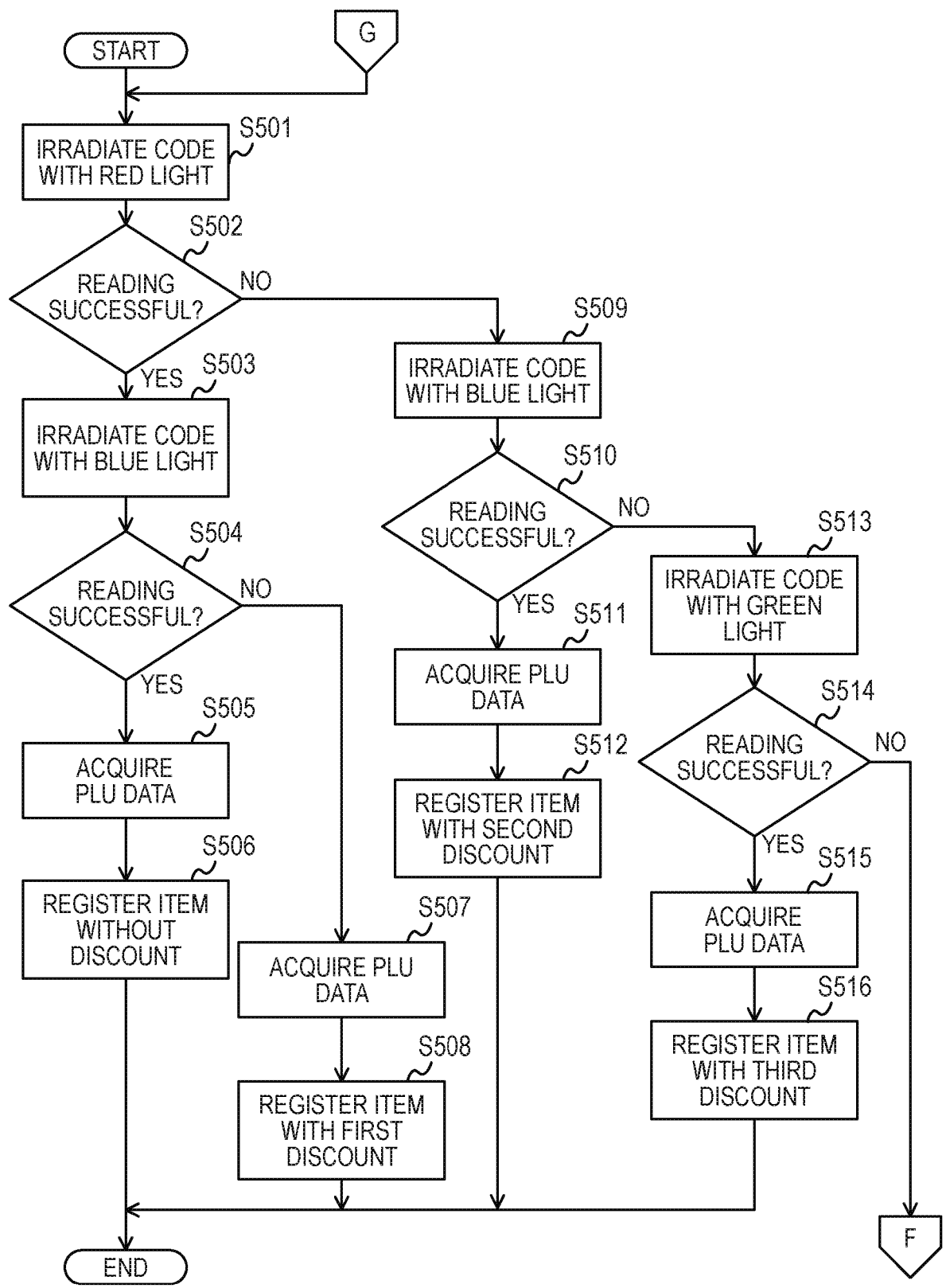
FIG. 21 is a diagram illustrating a flowchart of the code reading method according to the fifth example embodiment.
Figure 22:
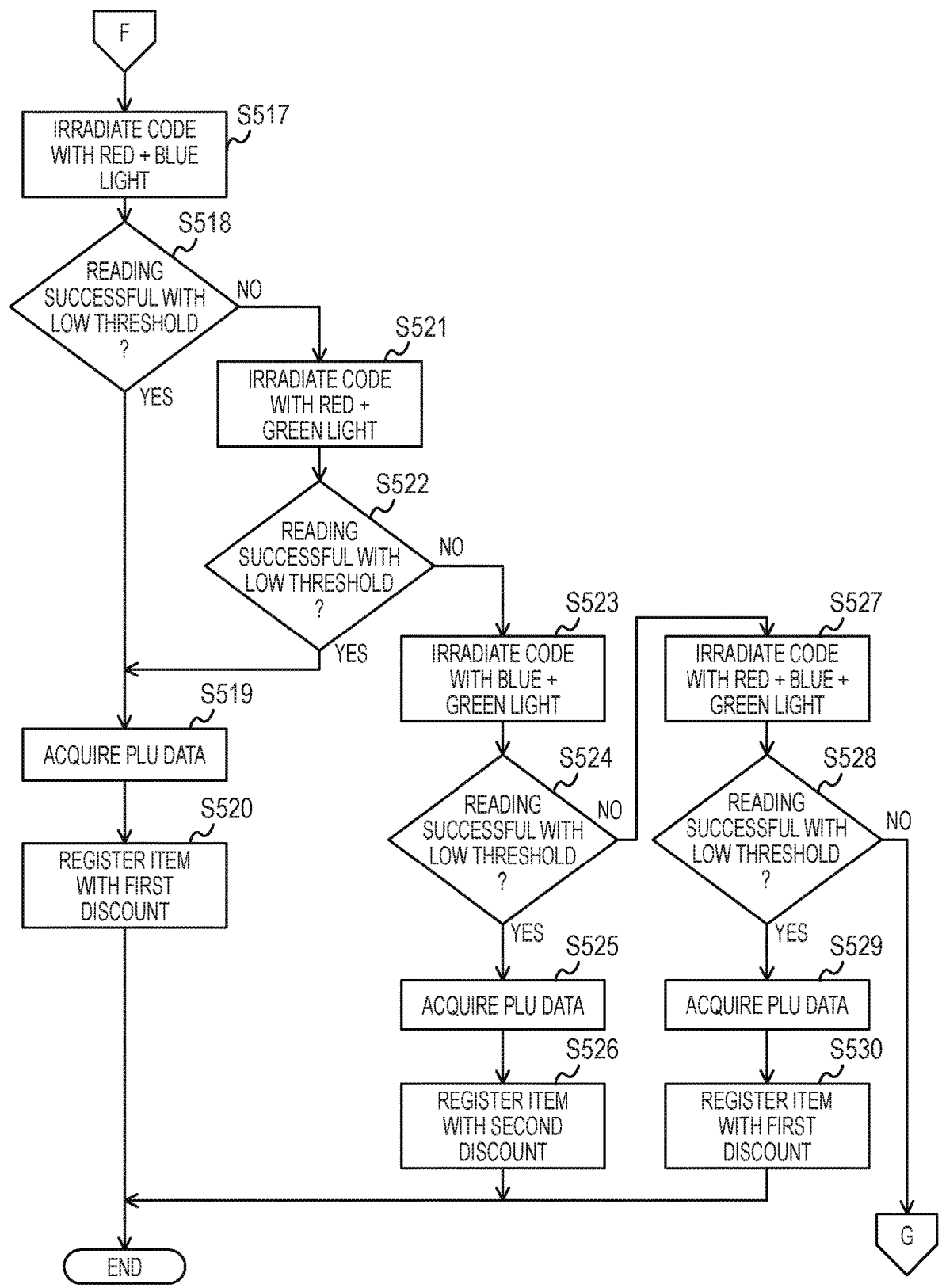
FIG. 22 is a diagram illustrating a flowchart of the code reading method according to the fifth example embodiment.

FIG. 21 and FIG. 22 are diagrams illustrating a flowchart of the code reading method according to the present example embodiment. FIG. 21 illustrates the former part of the flowchart of the code reading method, and FIG. 22 illustrates the latter part of the flowchart of the code reading method. The code reading method is started by a shop assistant performing an operation to start reading of a code attached to an item on the POS terminal 100, for example.

Steps S501 to S516 of FIG. 21 are the same as steps S401 to S416 of FIG. 16. However, a process performed if the information of the code A is not read by any of a red light, a blue light, and a green light (step S514, NO) is different from the process (step S414, NO) of FIG. 16.

If the information of the code A is not read by any of a red light, a blue light, and a green light (step S514, NO), the light color control unit 110 then controls the code scanner 10 to irradiate the code A with a mixed light of a red light and a blue light (step S517). The code reading unit 120 receives, from the code scanner 10, a signal indicating a light from the code A, sets the threshold used for distinguishing a region of a space and a region of a line of the code A to the low threshold C2 (30% of the maximum voltage difference in this example) that is lower than in the case of a single-color light, and then decodes the light from the code A in accordance with a predetermined rule. As a result of decoding, if the information of the code A is read with the mixed light of the red light and the blue light (step S518, YES), the discount processing unit 140 determines to make a discount. The item information acquisition unit 130 acquires item information (PLU data) from the PLU server 30 based on an identifier of the item read from the code A (step S519), and the discount processing unit 140 applies the first discount (for example, a 50% discount) corresponding to the mixed light of the red light and the blue light with which the reading is successful and then registers the item information as a payment subject (step S520).

As a result of decoding, if the information of the code A is not read with the mixed light of the red light and the blue light (step S518, NO), the light color control unit 110 then controls the code scanner 10 to irradiate the code A with a mixed light of a red light and a green light (step S521). The code reading unit 120 receives, from the code scanner 10, a signal indicating a light from the code A, sets the threshold used for distinguishing a region of a space and a region of a line of the code A to the low threshold C2 that is lower than in the case of a single-color light, and then decodes the light from the code A in accordance with a predetermined rule. As a result of decoding, if the information of the code A is read with the mixed light of the red light and the green light (step S522, YES), the discount processing unit 140 determines to make a discount. The item information acquisition unit 130 acquires item information (PLU data) from the PLU server 30 based on an identifier of the item read from the code A (step S519), and the discount processing unit 140 applies the first discount (for example, a 50% discount) corresponding to the mixed light of the red light and the green light with which the reading is successful and then registers the item information as a payment subject (step S520).

As a result of decoding, if the information of the code A is not read with the mixed light of the red light and the green light (step S522, NO), the light color control unit 110 then controls the code scanner 10 to irradiate the code A with a mixed light of a blue light and a green light (step S523). The code reading unit 120 receives, from the code scanner 10, a signal indicating a light from the code A, sets the threshold used for distinguishing a region of a space and a region of a line of the code A to the low threshold C2 that is lower than in the case of a single-color light, and then decodes the light from the code A in accordance with a predetermined rule. As a result of decoding, if the information of the code A is read with the mixed light of the blue light and the green light (step S524, YES), the discount processing unit 140 determines to make a discount. The item information acquisition unit 130 acquires item information (PLU data) from the PLU server 30 based on an identifier of the item read from the code A (step S525), and the discount processing unit 140 applies the second discount (for example, a 30% discount) corresponding to the mixed light of the blue light and the green light with which the reading is successful and then registers the item information as a payment subject (step S526).

As a result of decoding, if the information of the code A is not read with the mixed light of the blue light and the green light (step S524, NO), the light color control unit 110 then controls the code scanner 10 to irradiate the code A with a mixed light of a red light, a blue light, and a green light (step S527). The code reading unit 120 receives, from the code scanner 10, a signal indicating a light from the code A, sets the threshold used for distinguishing a region of a space and a region of a line of the code A to the low threshold C2 that is lower than in the case of a single-color light, and then decodes the light from the code A in accordance with a predetermined rule. As a result of decoding, if the information of the code A is read with the mixed light of the red light, the blue light, and the green light (step S528, YES), the discount processing unit 140 determines to make a discount. The item information acquisition unit 130 acquires item information (PLU data) from the PLU server 30 based on an identifier of the item read from the code A (step S529), and the discount processing unit 140 applies the first discount (for example, a 50% discount) corresponding to the mixed light of the red light, the blue light, and the green light with which the reading is successful and then registers the item information as a payment subject (step S530).

If the information of the code A is not read with the mixed light of the red light, the blue light, and the green light (step S528, NO), the process returns to step S501, and reading of the code A is repeated.

The flowchart of FIG. 21 and FIG. 22 is an example, and the order or the content of the steps may be changed as appropriate unless the function of the present example embodiment is impaired.

The CPU 101 of the POS terminal 100 (or the CPU 13 of the code scanner 10) serves as a subject of each step (process) included in the code reading method illustrated in FIG. 21 and FIG. 22. That is, the CPU 101 reads a code reading program used for performing the code reading method illustrated in FIG. 21 and FIG. 22 from the memory 102 or the storage device 103, executes the program to control each unit of the POS terminal 100, and thereby performs the code reading method illustrated in FIG. 21 and FIG. 22.

While the colors of the discount line B are red, blue, and green in the present example embodiment, other colors (for example, the intermediate color described in the third example embodiment) may be used. Further, while the background color of the code A is white, another color may be used, and in such a case, the threshold used in reading may be changed as appropriate.

As described above, since different discounts can be made for respective colors of lights with which reading of the information of the code A is successful in the present example embodiment, it is possible to finely control a discount by drawing the discount lines B of different colors. Furthermore, since it is possible to determine whether or not to make a discount even when the discount lines B of a plurality of colors are drawn on the code A, it is possible to change the discount applied to the item by drawing one discount line B on an item and then drawing another discount line B thereon.

Other Example Embodiments

Figure 23:
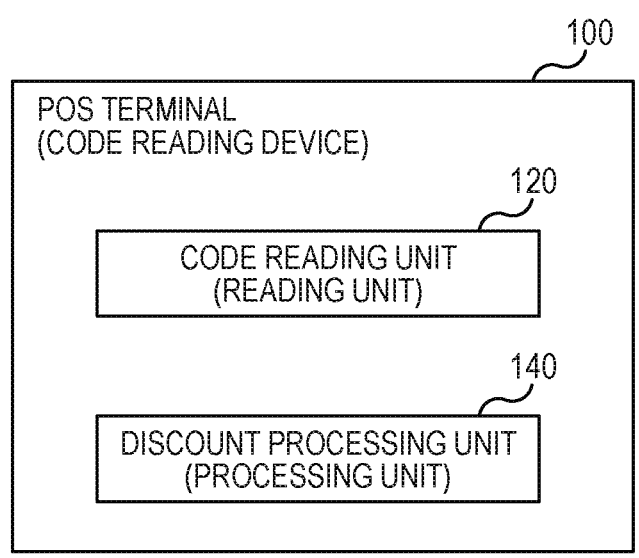
FIG. 23 is a schematic configuration diagram of a POS terminal according to each example embodiment.

FIG. 23 is a schematic configuration diagram of the POS terminal 100 according to each example embodiment described above. FIG. 23 illustrates a configuration example by which the POS terminal 100 functions as a code reading device that reads information of a code by irradiating a code attached to an item with lights of two different colors and makes a discount by detecting the presence of a discount line. The POS terminal 100 has a code reading unit 120 (reading unit) that reads information of the code based on a reflected light from a code attached to an item and a discount processing unit 140 (processing unit) that, when the information of the code is not read by using a first light being irradiated on the code and the information of the code is read by using a second light being irradiated on the code, makes a discount associated with the second light for the item. The second light is different from the first light. Further, the stationary type code scanner 10 illustrated in FIG. 4 may be configured as a code reading device.

The present invention is not limited to the example embodiments described above and can be properly changed within the scope not departing from the spirit of the present invention.

Further, the scope of each of the example embodiments includes a processing method that stores, in a storage medium, a program that causes the configuration of each of the example embodiments to operate so as to implement the function of each of the example embodiments described above (for example, a program that causes the POS terminal 100 to perform the process illustrated in FIG. 8, FIG. 11, FIG. 16, FIG. 21, and FIG. 22), reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)
A code reading device comprising:
a reading unit that reads information of a code based on a reflected light from the code attached to an item; and
a processing unit that, when the information of the code is not read by using a first light being irradiated on the code and the information of the code is read by using a second light being irradiated on the code, makes a discount associated with the second light for the item, wherein the second light is different from the first light.

(Supplementary Note 2)
The code reading device according to supplementary note 1 further comprising a control unit that performs control to irradiate the code with either the first light or the second light.

(Supplementary Note 3)
The code reading device according to supplementary note 1 or 2,
wherein the second light is a mixed light of at least two lights, and
wherein the processing unit makes the discount associated with the mixed light.

(Supplementary Note 4)
The code reading device according to supplementary note 3, wherein the processing unit makes the largest discount of respective discounts associated with the at least two lights included in the mixed light.

(Supplementary Note 5)
The code reading device according to any one of supplementary notes 1 to 4, wherein each of the first light and the second light is any one of a red light, a blue light, a green light, and an intermediate-color light.

(Supplementary Note 6)
The code reading device according to any one of supplementary notes 1 to 4, wherein the first light is a first intermediate-color light, and the second light is a second intermediate-color light that is different from the first intermediate-color light.

(Supplementary Note 7)
A code reading method comprising:
reading information of a code based on a reflected light from the code attached to an item; and
when the information of the code is not read by using a first light being irradiated on the code and the information of the code is read by using a second light being irradiated on the code, making a discount associated with the second light for the item, wherein the second light is different from the first light.

(Supplementary Note 8)
A code reading program that causes a computer to perform:
reading information of a code based on a reflected light from the code attached to an item; and
when the information of the code is not read by using a first light being irradiated on the code and the information of the code is read by using a second light being irradiated on the code, making a discount associated with the second light for the item, wherein the second light is different from the first light.

This application is based upon and claims the benefit of priority from Japanese Patent Application No. 2017-079513, filed on Apr. 13, 2017, the disclosure of which is incorporated herein in its entirety by reference.

REFERENCE SIGNS LIST

100 POS terminal
110 light color control unit
120 code reading unit
130 item information acquisition unit
140 discount processing unit

What is claimed is:

1. A code reading device comprising:
a control unit configured to control to irradiate a code attached to an item with a first light and a second light different from the first light;
a reading unit configured to read information corresponding to the code based on a reflected light from the code; and
a processing unit configured to:
apply no discount to a price of the item when a first reading with the first light is successful;
apply a discount to the price of the item by a discount condition associated with the second light when a second reading with the second light is successful based on the first reading being unsuccessful.

2. The code reading device according to claim 1, wherein the control unit performs control to irradiate the code with either the first light or the second light.

3. The code reading device according to claim 1, wherein the second light is a mixed light of at least two lights, and
wherein the processing unit makes the discount associated with the mixed light.

4. The code reading device according to claim 3, wherein the processing unit makes the largest discount of respective discounts associated with the at least two lights included in the mixed light.

5. The code reading device according to claim 1, wherein each of the first light and the second light is any one of a red light, a blue light, a green light, and an intermediate-color light.

6. The code reading device according to claim 1, wherein the first light is a first intermediate-color light, and the second light is a second intermediate-color light that is different from the first intermediate-color light.

7. A code reading method comprising:
controlling to irradiate a code attached to an item with a first light and a second light different from the first light;
reading information corresponding to the code based on a reflected light from the code,
applying no discount to a price of the item when a first reading with the first light is successful; and
applying a discount to a price of the item by a discount condition associated with the second light when a second reading with the second light is successful based on the first reading being unsuccessful.

8. A non-transitory storage medium in which a code reading program is stored, the code reading program that causes a computer to perform:
controlling to irradiate a code attached to an item with a first light and a second light different from the first light;
reading information corresponding to the code based on a reflected light from the code,
applying no discount to a price of the item when a first reading with the first light is successful; and
applying a discount to a price of the item by a discount condition associated with the second light when a second reading with the second light is successful based on the first reading being unsuccessful.

* * * * *